United States Patent
Iwaguchi et al.

(10) Patent No.: US 11,526,066 B2
(45) Date of Patent: Dec. 13, 2022

(54) ILLUMINATION OPTICAL SYSTEM FOR IMAGING DEVICE

(71) Applicant: FUJITSU FRONTECH LIMITED, Inagi (JP)

(72) Inventors: Isao Iwaguchi, Inagi (JP); Yuki Hasegawa, Inagi (JP)

(73) Assignee: FUJITSU FRONTECH LIMITED, Tokyo (JP)

(*) Notice: Subject to any disclaimer, the term of this patent is extended or adjusted under 35 U.S.C. 154(b) by 183 days.

(21) Appl. No.: 16/990,585

(22) Filed: Aug. 11, 2020

(65) Prior Publication Data
US 2020/0371408 A1 Nov. 26, 2020

Related U.S. Application Data

(63) Continuation of application No. PCT/JP2018/006030, filed on Feb. 20, 2018.

(51) Int. Cl.
*G02B 5/02* (2006.01)
*G02B 5/04* (2006.01)
(Continued)

(52) U.S. Cl.
CPC ............ *G03B 15/02* (2013.01); *G02B 5/0221* (2013.01); *G02B 5/0278* (2013.01); *G02B 5/045* (2013.01);
(Continued)

(58) Field of Classification Search
CPC ............ G05B 2219/40538; G05B 2219/36371; G02B 5/045
See application file for complete search history.

(56) References Cited

U.S. PATENT DOCUMENTS 7,995,298 B2    8/2011  Chen
9,366,943 B2    6/2016  Tenmyo et al.
(Continued)

FOREIGN PATENT DOCUMENTS

CN    101029950    9/2007
CN    102576102    7/2012
(Continued)

OTHER PUBLICATIONS

Office Action, dated May 8, 2021, in corresponding Chinese Patent Application No. 201880089155.3 (19 pp.).
(Continued)

*Primary Examiner* — Eric T Eide
(74) *Attorney, Agent, or Firm* — Staas & Halsey LLP

(57) ABSTRACT

An illumination optical system includes a plurality of light sources arranged in an annular shape, and a prism plate that is formed in an annular shape about an optical axis of illumination light from the light sources. The prism plate includes a prism surface, upon which the illumination light falls incident and on which prism a plurality of prisms arranged in an annular shape along a circumferential direction of the prism plate, are formed, a flat section upon which the illumination light falls incident and which is formed in an annular shape along the circumferential direction of the prism plate, and an emission plane that emits the illumination light. The prism surface is formed on an outer peripheral side outward from a radius of the prism plate that is centered on the optical axis, and the flat section is formed on an inner peripheral side inward from the radius.

14 Claims, 20 Drawing Sheets

(51) Int. Cl.
*G06V 40/13* (2022.01)
*G03B 15/02* (2021.01)
*F21V 8/00* (2006.01)

(52) U.S. Cl.
CPC ......... *G02B 6/0045* (2013.01); *G02B 6/0068* (2013.01); *G06V 40/1324* (2022.01)

(56) References Cited

U.S. PATENT DOCUMENTS

| | | | | |
|---|---|---|---|---|
| 2006/0039692 A1* | 2/2006 | Lee | ......................... | G03B 15/05 396/198 |
| 2006/0209417 A1* | 9/2006 | Kojima | .................. | G02B 6/003 359/618 |
| 2007/0206391 A1 | 9/2007 | Matsuo et al. | | |
| 2011/0176089 A1* | 7/2011 | Ishikawa | .............. | G02B 6/0055 362/621 |
| 2012/0154672 A1 | 6/2012 | Yamazaki et al. | | |
| 2013/0128571 A1 | 5/2013 | Yamazaki et al. | | |
| 2013/0329437 A1* | 12/2013 | Yamazaki | ............ | H04N 5/2256 362/311.06 |
| 2014/0209796 A1* | 7/2014 | Ishii | ........................ | G03B 15/05 362/17 |

FOREIGN PATENT DOCUMENTS

| | | |
|---|---|---|
| CN | 103380440 | 10/2013 |
| JP | 2007-233282 A | 9/2007 |
| WO | 2007/108443 A1 | 9/2007 |
| WO | 2011/052018 A1 | 5/2011 |
| WO | 2011/052101 A1 | 5/2011 |
| WO | 2012/117510 A1 | 9/2012 |

OTHER PUBLICATIONS

International Search Report dated May 29, 2018 in corresponding International Patent Application No. PCT/JJP2018/006030.
Extended European Search Report, dated Nov. 25, 2020, in European Application No. 18907169.9 (7 pp.).
Communication Pursuant to Article 94(3) EPC, dated Jul. 5, 2021, in corresponding European Application No. 18907169.9 (4 pp.).

* cited by examiner

| TYPE OF ILLUMINATION LIGHT | 1 | 2 | 3 |
|---|---|---|---|
| RADIAL DIRECTION | 100% (DIRECT LIGHT) | (100-P)% | 100% (INNER WALL REFLECTED LIGHT) |
| CIRCUMFERENTIAL DIRECTION | 0% | P% | 0% |
| POINT OF ARRIVAL OF ILLUMINATION LIGHT ON PALM | CENTRAL SECTION | CENTRAL SECTION AND PERIPHERAL SECTION | PERIPHERAL SECTION |

ILLUMINATION OPTICAL SYSTEM FOR IMAGING DEVICE

CROSS-REFERENCE TO RELATED APPLICATION

This application is a continuation application of International Application PCT/JP2018/006030, filed on Feb. 20, 2018 and designating the U.S., the entire contents of which are incorporated herein by reference.

FIELD

The present invention relates to an illumination optical system for an imaging device.

BACKGROUND

Types of imaging devices that are known include an imaging device intended to read information from an object (appears simply as "imaging device" hereinbelow) such as a palm vein authentication device or a barcode reader. FIG. 1 is a diagram illustrating a configuration of an imaging device intended to read information from an object. As illustrated in FIG. 1, this kind of imaging device 100 has a configuration that includes an illumination optical system 101 and an imaging optical system 103. The imaging device 100 reads information of an object 106 as a result of an LED (Light Emitting Diode) 102, which is one example of a light source, projecting illumination light onto an object 106 and of an image sensor 105, provided on the image side of an imaging lens 104, detecting specularly reflected light and scattered light that fall incident via the object 106. The object 106 is, for example, a palm, or a sheet of paper with a barcode printed thereon, or the like.

Incidentally, as illustrated in FIG. 1, at each point of the surface of the object 106 onto which illumination light is projected, specularly reflected light (the solid lines in FIG. 1) and scattered light (the broken lines in FIG. 1) of a weak light intensity in comparison with the specularly reflected light, are generated. However, the specularly reflected light generated at all the points in the field of view of the imaging optical system 103, does not necessarily fall incident on the image sensor 105. Hence, at the point, where the specularly reflected light is detected by the image sensor 105 (point B in FIG. 1), and at the points, where the specularly reflected light is not detected (points A and C in FIG. 1), the detected light amounts are different even if the points are illuminated with the same illuminance.

The light amount difference, caused by the specularly reflected light (hereinafter called specular reflection noise), is one factor that causes degradation in the reading accuracy of the imaging device. Therefore, in the field of imaging devices, technology for enhancing the reading accuracy of an imaging device by suppressing specular reflection noise, is desirable.

Although the generation of local regions of high luminance in the object may be prevented, in order to suppress the specular reflection noise and improve the reading accuracy of the imaging device, this does not necessarily mean that illuminance may simply be made uniform. To this end, the directivity of the illumination light may be controlled so that the light, which is generated by the object, is suitably guided to the imaging optical system. As technology for controlling the directivity of light, there exists technology for controlling the light emission direction by using a prism plate (see Patent Literature 1, for example).

FIGS. 2 to 7 is a diagram to illustrate control of the light emission direction using a prism plate pertaining to the prior art. FIG. 2 is a diagram illustrating the relationship between incident light and emitted light, at an XZ cross section of a prism plate of the prior art. FIG. 3 is a diagram illustrating the relationship between incident light falling perpendicularly incident on the prism plate, and emitted light, at an XZ cross section of the prism plate illustrated in FIG. 2. FIG. 4 is a diagram illustrating the relationship between the incident light falling perpendicularly incident on the prism plate illustrated in FIG. 2, and emitted light, at a YZ cross section along line AA illustrated in FIG. 3. FIG. 5 is a diagram illustrating the relationship between the incident light when the prism plate, which is illustrated in FIG. 2, is viewed from the emission plane, and emitted light. FIG. 6 is a diagram illustrating the relationship between incident light and emitted light, at an XZ cross section of a prism plate of the prior art in which a ridge line is provided with a flat section. FIG. 7 is a diagram illustrating the directivity of emitted light when the prism plate, which is illustrated in FIG. 6, is viewed from the emission plane. The XYZ coordinate system in FIGS. 2 to 7 is a right-handed orthogonal coordinate system provided for the sake of convenience in referring to directions.

A prism plate 200, which is illustrated in FIG. 2, includes a prism surface 201, in which a plurality of prism rows each having a ridge line 202 are arranged parallel to each other along an X-axis direction, and a flat surface 203, as an incidence plane and an emission plane, respectively. The incident light that falls perpendicularly incident on the prism plate 200 (more precisely, the incident light that does not have a Y-axis direction component; see the solid lines in FIG. 2), is deflected in the X-axis direction, which orthogonally intersects the ridge lines 202, as illustrated in FIGS. 3 and 4. Furthermore, the incident light that does not fall perpendicularly incident on the prism plate 200 (more precisely, the incident light that has a Y-axis direction component; see the broken lines in FIG. 2), is also similarly deflected in the X-axis direction at the prism surface 201. Hence, as illustrated in FIG. 5, although the emitted light is not emitted in the Y-axis direction (the ridge line direction) parallel to the ridge lines 202 at the flat surface 203 which is the emission plane, the emitted light has a Y-axis direction component according to the Y-axis direction component of the incident light. Thus, the prism plate 200 makes it possible to control the directivity of the emitted light by controlling the emission direction by deflecting the incident light falling incident from the prism surface 201 side, due to the incident light being refracted at the prism surface 201 and the flat surface 203.

In addition, in the prior art disclosed in Patent Literature 1, a prism plate 200-1 is used, in which a ridge line 202-1 is provided with a flat section 201-1b and which includes a prism surface 201-1 that includes an oblique section 201-1a and the flat section 201-1b, as illustrated in FIG. 6. At the prism plate 200-1, illumination light falling incident on the oblique section 201-1a of the prism surface 201-1, is deflected in the alignment direction (the X-axis direction) by way of refraction at the prism surface 201-1. However, the illumination light falling incident on the flat section 201-1b of the prism surface 201-1, passes through the prism plate 200-1 without being deflected in the alignment direction by way of refraction at the prism surface 201-1. Furthermore, where the illumination light falling incident on the flat section 201-1b, is concerned, because the emitting flat surface 203 is parallel to the flat section 201-1b, even though the illumination light passes through the flat section 201-1b and the flat surface 203, the ratio between the alignment direction (the X-axis direction) component and the ridge line direction (the Y-axis direction) component, is also maintained.

Thus, as illustrated in the directivity distribution of FIG. 7, according to the prior art using the prism plate 200-1, illumination light can also be emitted in the ridge line direction. Furthermore, in comparison with the prism plate 200, which is illustrated in FIG. 2, that deflects all the incident illumination light in the alignment direction, using the prism plate 200-1, the light amount of illumination light deflected in the alignment direction, can be suppressed. Hence, according to the prior art using the prism plate 200-1, at the flat surface 203, which is the emission plane of the illumination light of the imaging device, ambient light, which bends outward (in the Y-axis direction), is formed, and spread toward the periphery of the illumination light is ensured. Accordingly, in the prior art that uses the prism plate 200-1, a bias, in the alignment direction (the X-axis direction), of the illumination light directivity is suppressed, and peripheral luminance at the emission plane of the illumination light of the imaging device is ensured. Thus, the difference in luminance between the central luminance and peripheral luminance of the illumination light at the emission plane, is reduced, and the luminance is made uniform.

Patent Literature 1: PCT International Publication No. 2012/117510

However, in the foregoing prior art, the illumination light, which is emitted in the alignment direction and in the ridge line direction, is scattered excessively to the outside beyond the object by the prism surface, and the central luminance sometimes drops. Furthermore, even when a flat surface is incorporated in the ridge line of the prism rows for compensation of the image sensor in a center axis direction, when a lot of light comes to be focused in a peripheral position of the object, there are cases where a distribution is produced in which the central luminance drops and there is excessive peripheral scatter, or, conversely, where light collects excessively in the center when an attempt is made to flatten the central luminance. Therefore, in cases where a luminance distribution is produced in which the periphery of the object is dark, and where the housing depth of the imaging device in particular is relatively deep, there is a problem in that light is suitably collected in the periphery of the object.

SUMMARY

According to an aspect of the embodiments, an illumination optical system for an imaging device includes: a plurality of light sources that is arranged in an annular shape; and a prism plate that is formed in an annular shape about an optical axis of illumination light from the plurality of light sources, wherein the prism plate includes a prism surface upon which the illumination light emitted from the light sources falls incident and on which prism rows, which contain a plurality of prisms that is arranged in an annular shape along a circumferential direction of the prism plate, are formed, a flat section upon which the illumination light from the light sources falls incident and which is formed in an annular shape along the circumferential direction of the prism plate, and an emission plane that emits the illumination light, wherein the prism surface is formed on an outer peripheral side outward from a predetermined radius of the prism plate that is centered on the optical axis, and wherein the flat section is formed on an inner peripheral side inward from the predetermined radius of the prism plate that is centered on the optical axis.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of the illumination optical system for an imaging device according to the technology disclosed in the present application, will be described in detail hereinbelow on the basis of the drawings. The technology disclosed in the present application is not limited to or by the embodiments hereinbelow. In the description of the embodiments and modifications hereinbelow, the same terms or the same reference signs are assigned to the foregoing constituent elements and processing, and descriptions thereof are omitted. In addition, some or all of the embodiments hereinbelow can be realized by being combined within a non-conflicting scope.

First Embodiment (Configuration of Imaging Device of the First Embodiment)

Figure 1:
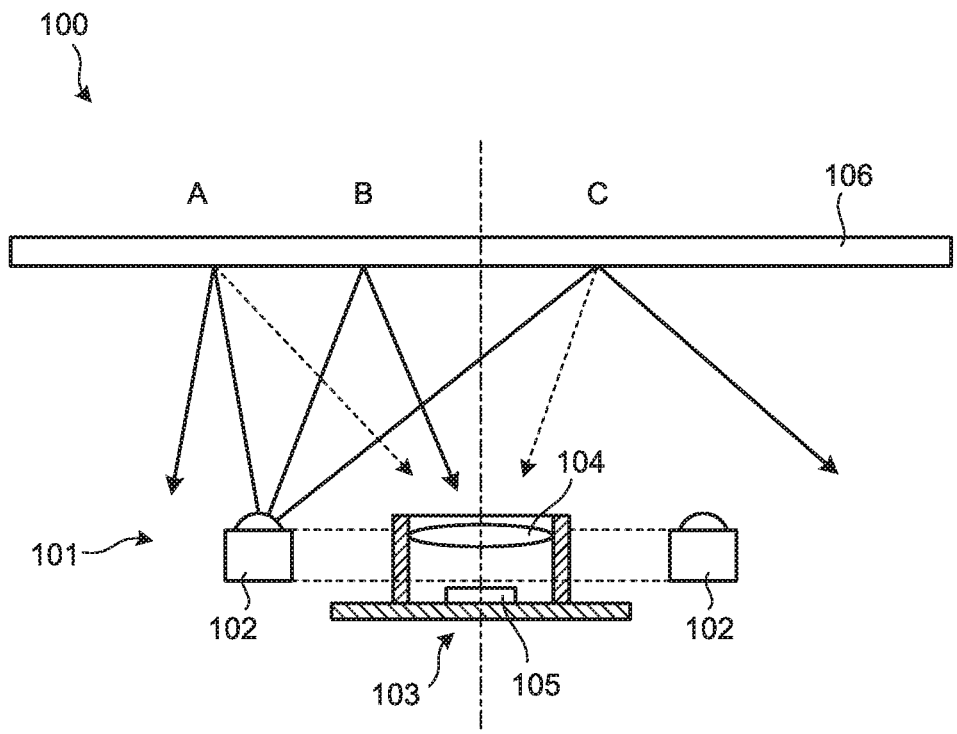
FIG. 1 is a diagram illustrating a configuration of an imaging device intended to read information from an object.
Figure 2:
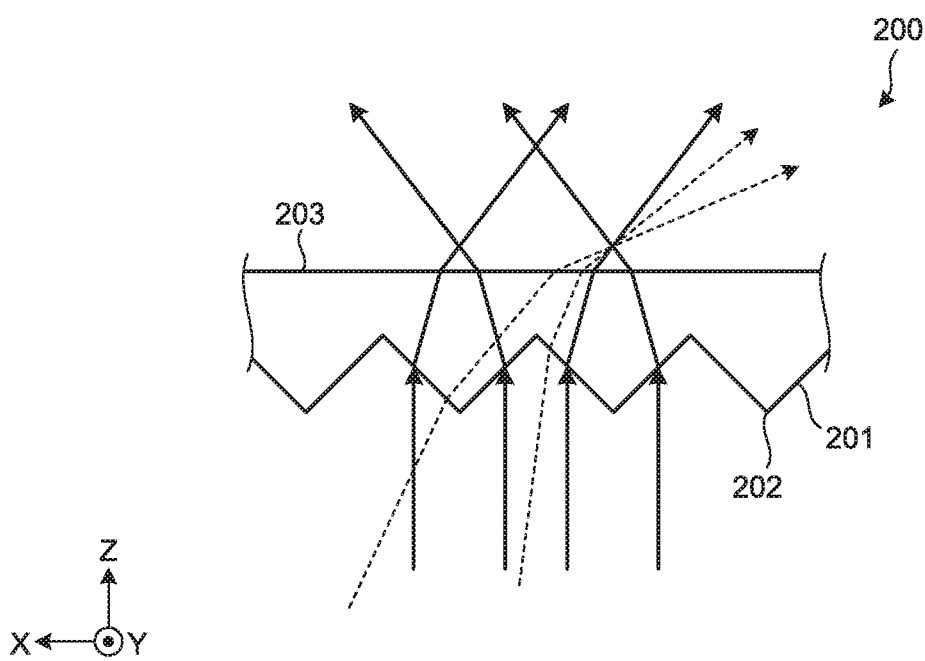
FIG. 2 is a diagram illustrating the relationship between incident light and emitted light, at an XZ cross section of a prism plate of the prior art.
Figure 3:
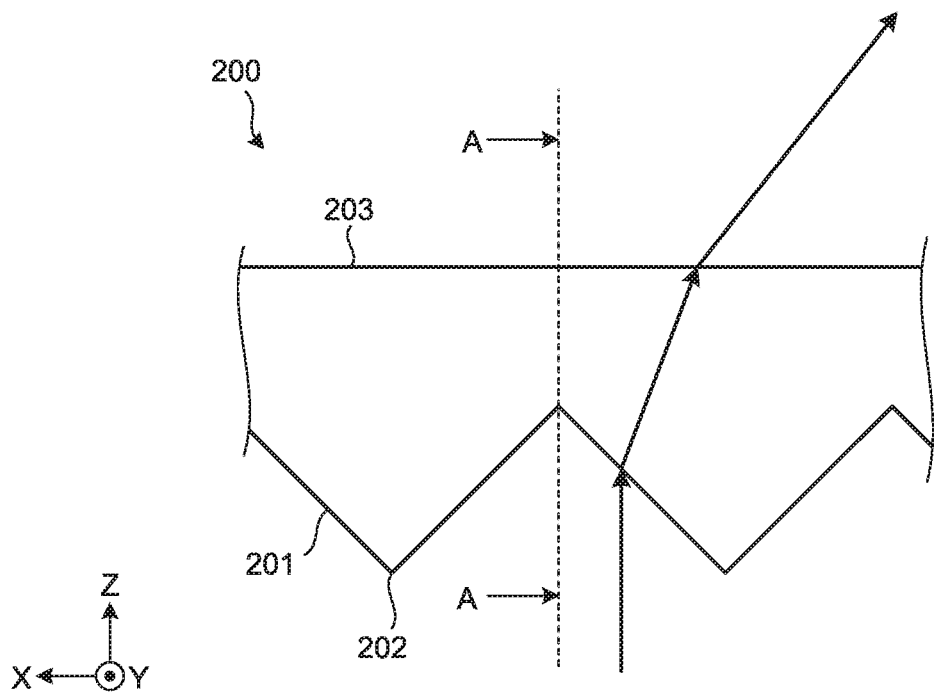
FIG. 3 is a diagram illustrating the relationship between incident light falling perpendicularly incident on the prism plate, and emitted light, at an XZ cross section of the prism plate illustrated in FIG. 2.
Figure 4:
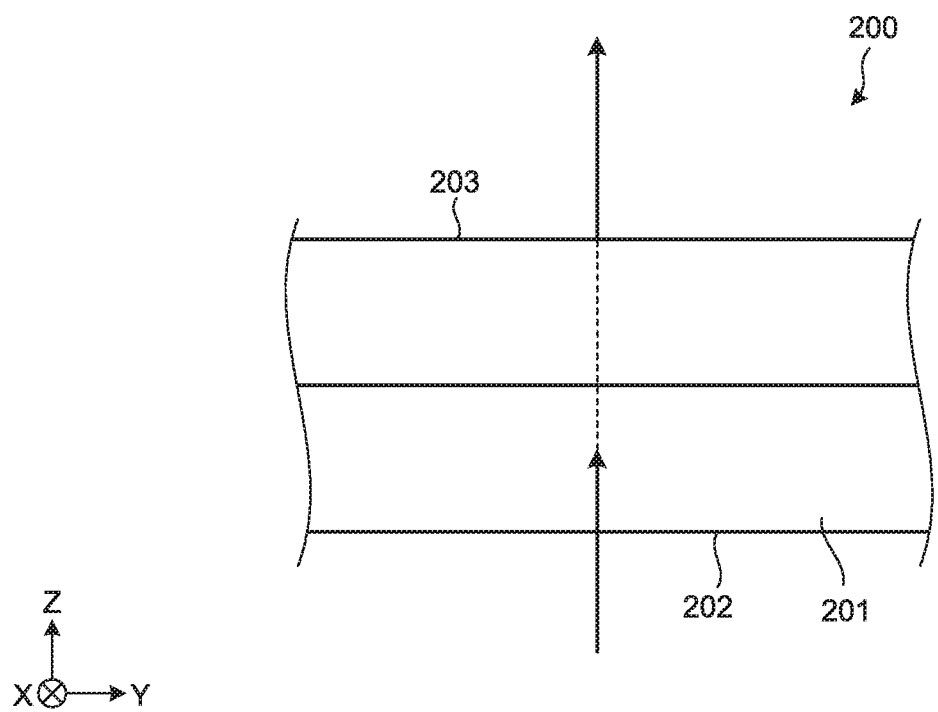
FIG. 4 is a diagram illustrating the relationship between the incident light falling perpendicularly incident on the prism plate illustrated in FIG. 2, and emitted light, at a YZ cross section along line AA illustrated in FIG. 3.
Figure 5:
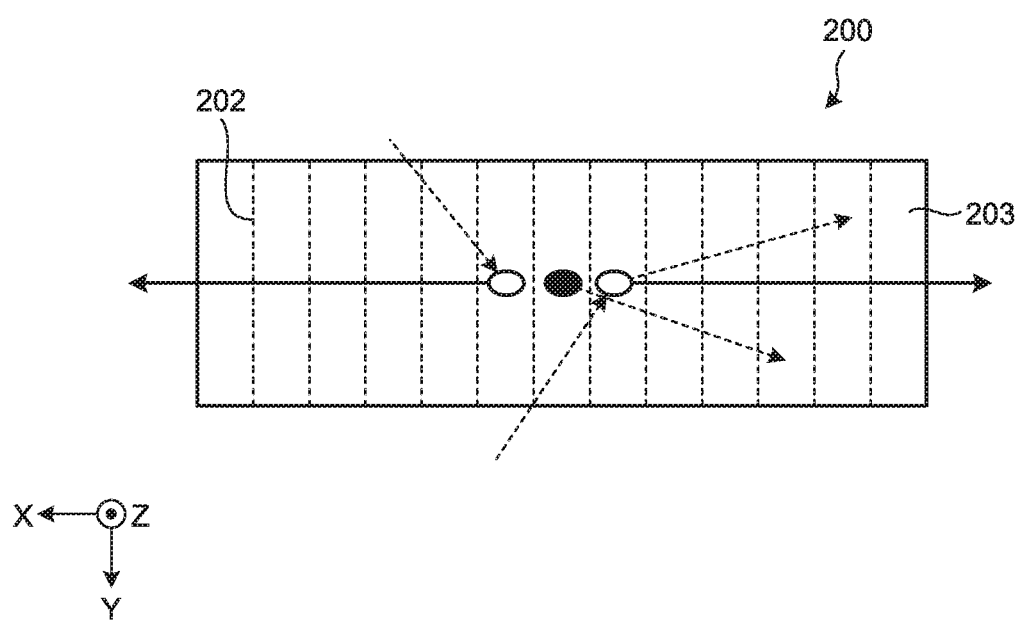
FIG. 5 is a diagram illustrating the relationship between the incident light when the prism plate, which is illustrated in FIG. 2, is viewed from the emission plane, and emitted light.
Figure 6:
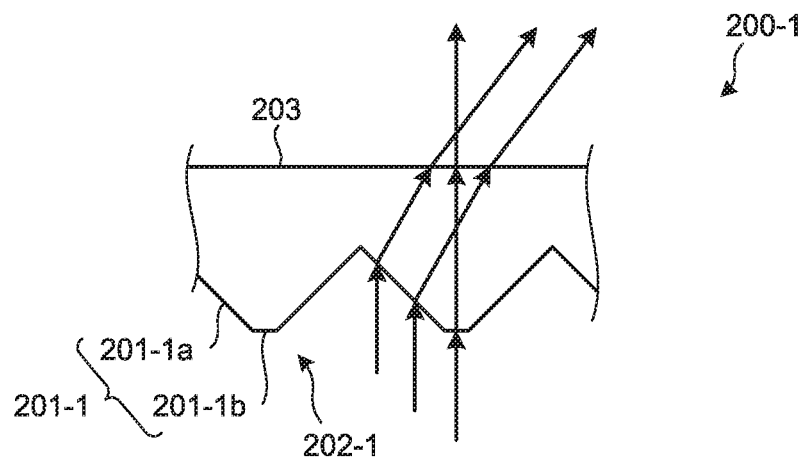
FIG. 6 is a diagram illustrating the relationship between incident light and emitted light, at an XZ cross section of a prism plate of the prior art in which a ridge line is provided with a flat section.
Figure 6:
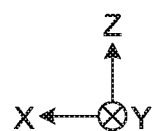
Figure 7:
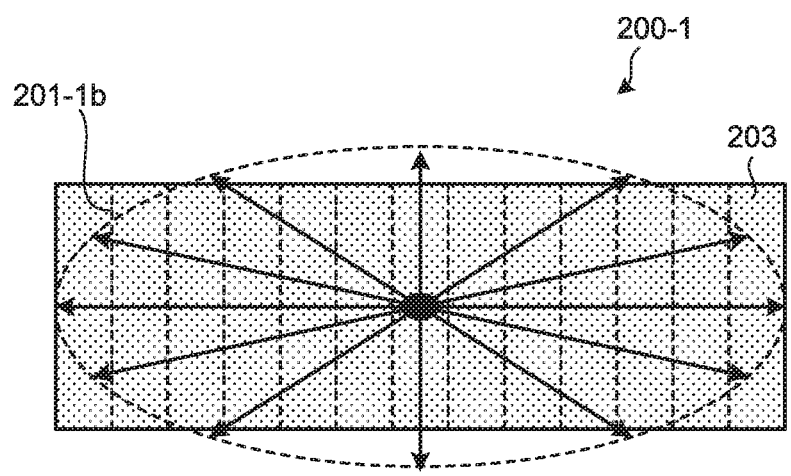
FIG. 7 is a diagram illustrating the directivity of emitted light when the prism plate, which is illustrated in FIG. 6, is viewed from the emission plane.
Figure 7:
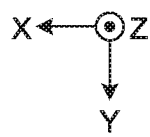
Figure 8:
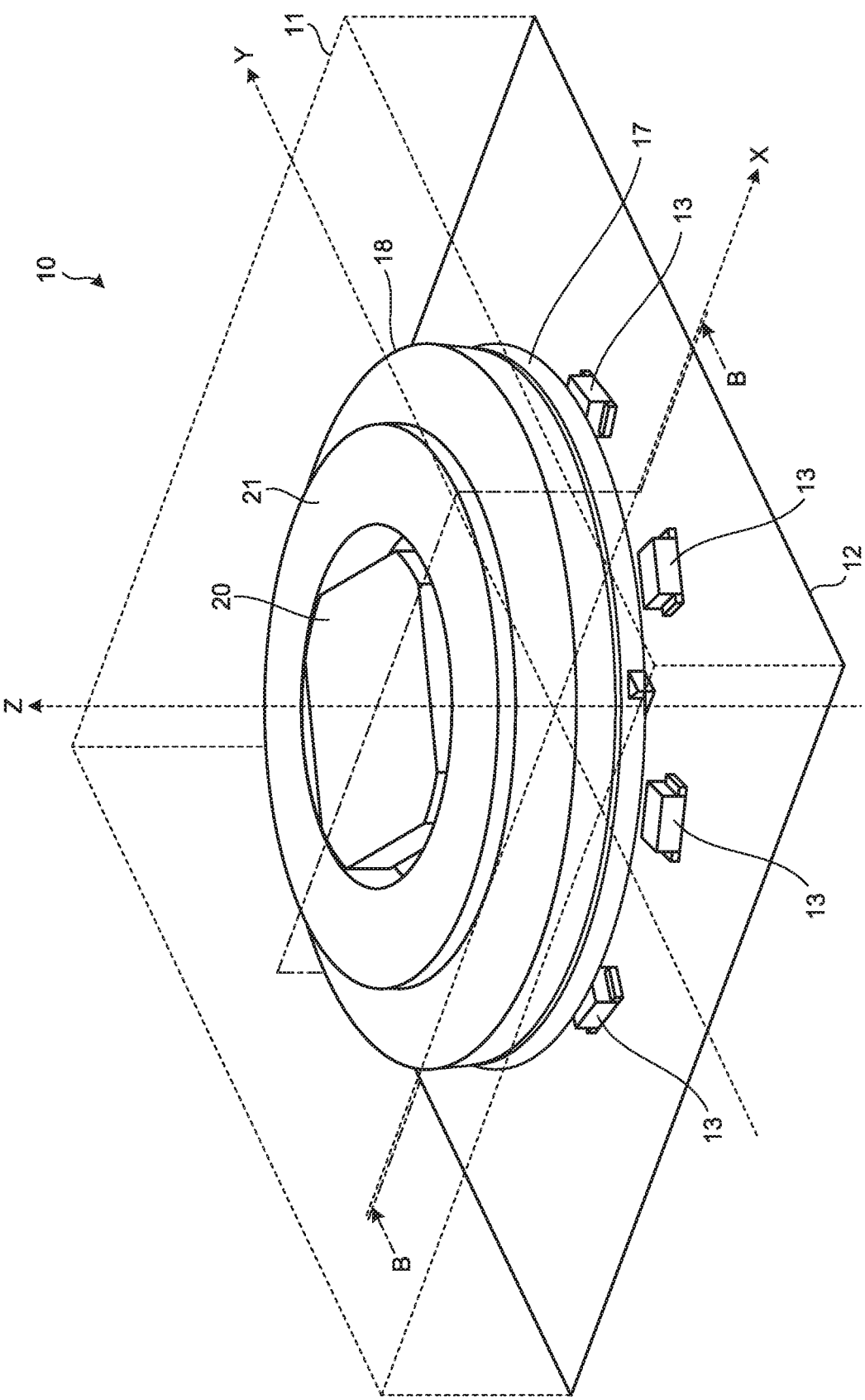
FIG. 8 is a diagram illustrating a configuration of an imaging device according to a first embodiment.
Figure 9:
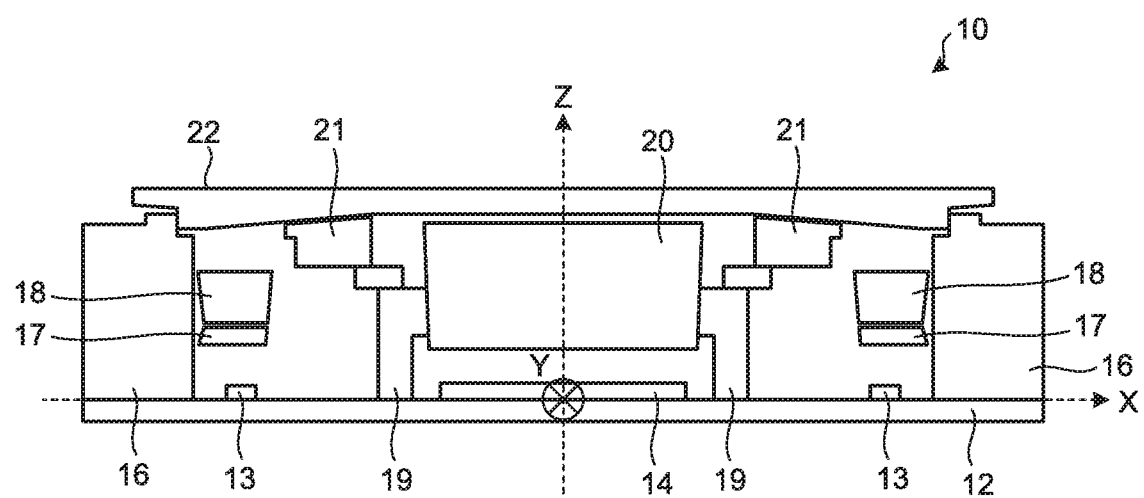
FIG. 9 is a diagram illustrating a configuration of an imaging device at an XZ cross section along line BB illustrated in FIG. 8.
Figure 10:
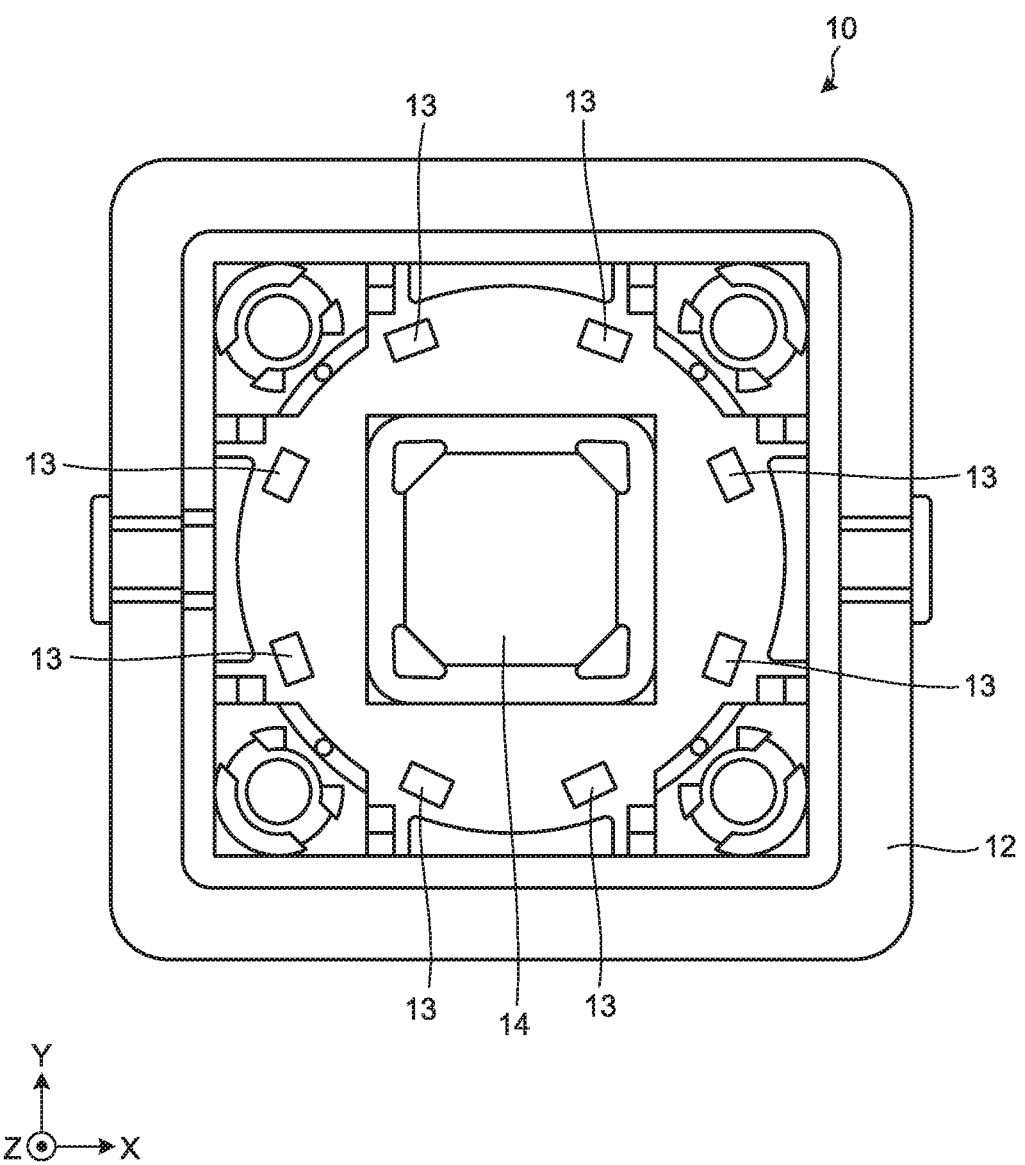
FIG. 10 is a view of a plane XY of a substrate of the imaging device illustrated in FIG. 8.

FIG. 8 is a diagram illustrating a configuration of an imaging device according to the first embodiment. FIG. 9 is a diagram illustrating a configuration of an imaging device at an XZ cross section along line BB illustrated in FIG. 8. FIG. 10 is a view of a plane XY of a substrate of the imaging device illustrated in FIG. 8.

An imaging device 10, which is illustrated in FIGS. 8 to 10, is an imaging device that is intended to read information from an imaging target, such as a palm vein authentication device, for example. The imaging device 10 includes, as main constituent elements, a housing 11, a substrate 12, an LED (Light Emitting Diode) 13, which is an example of a light source, and an image sensor 14, which is an example of an imaging element (an imaging unit). Furthermore, the imaging device 10 includes, as main constituent elements, a lens opening (an aperture) 16, a light guide body 17, a prism plate 18, a support part 19, a lens unit 20, a hood 21, and a cover 22. The imaging optical system of the imaging device 10 includes the image sensor 14 and the lens unit 20. The illumination optical system of the imaging device 10 includes the LED 13, the light guide body 17 and the prism plate 18.

In FIG. 8, illustrations of the image sensor 14, the lens opening 16, the support part 19, and the cover 22 are omitted. An illustration of the housing 11 is also omitted from FIG. 9. Furthermore, illustrations of the housing 11, the image sensor 14, the lens opening 16, the light guide body 17, the prism plate 18, the support part 19, the lens unit 20, the hood 21, and the cover 22, are omitted from FIG. 10.

Note that the XYZ coordinate system of the first embodiment is a right-handed orthogonal coordinate system, which is provided for the purpose of referring to directions and positions. As illustrated in FIGS. 8 and 9, the XYZ coordinate system of the first embodiment has, as its point of origin, a center of the region, of the substrate 12, where the image sensor 14 is mounted. Furthermore, the XYZ coordinate system of the first embodiment has an X axis, a Y axis, and a Z axis of a right-handed orthogonal coordinate system, in which upward of the cover 22 of the imaging device 10, to which an imaging target such as a palm is held up, is taken as the positive direction of the Z axis, and in which the substrate 12 is contained in plane XY.

The imaging device 10 includes, above the substrate 12, the image sensor 14, a plurality of the LED 13, the lens opening 16, the light guide body 17, the prism plate 18, and the lens unit 20, which is supported by the support part 19. In addition, the imaging device 10 includes the hood 21, which is supported by the support part 19, and the cover 22, which is supported by the lens opening 16. Further, the imaging device 10 includes, above a control board (not illustrated), an image processing device which is a processing device such as a microcomputer.

The image sensor 14 is mounted in the middle of the substrate 12. The center of the image sensor 14 is located at the point of origin of the XYZ coordinate system. The lens unit 20 is arranged above the substrate 12, roughly in a circle around the image sensor 14. Furthermore, the plurality of LEDs 13 are arranged above the substrate 12, roughly in a circle around the lens unit 20. Note that, although the plurality of LEDs 13 are divided into two types of LED groups with different wavelengths, no such distinction is made in the embodiment. In addition, although light receiving elements, which receive the light emitted by the plurality of LEDs 13, are arranged above the substrate 12, an illustration of the light receiving elements is omitted.

The illumination light emitted by the LEDs 13 passes through the light guide body 17 and the prism plate 18, which have an annular shape centered on the Z axis, and is emitted upward from the cover 22 as illumination light. The illumination light illuminates a palm, which is held up from above the cover 22, and is reflected or absorbed by the palm. The image sensor 14 captures, through the lens of the lens unit 20, an image of the palm that is held up from above the cover 22. The optical axis, when the image sensor 14 captures an image of the palm held up from above the cover 22, coincides with the Z axis.

(Configuration of Imaging Device of the First Embodiment)

Figure 11:
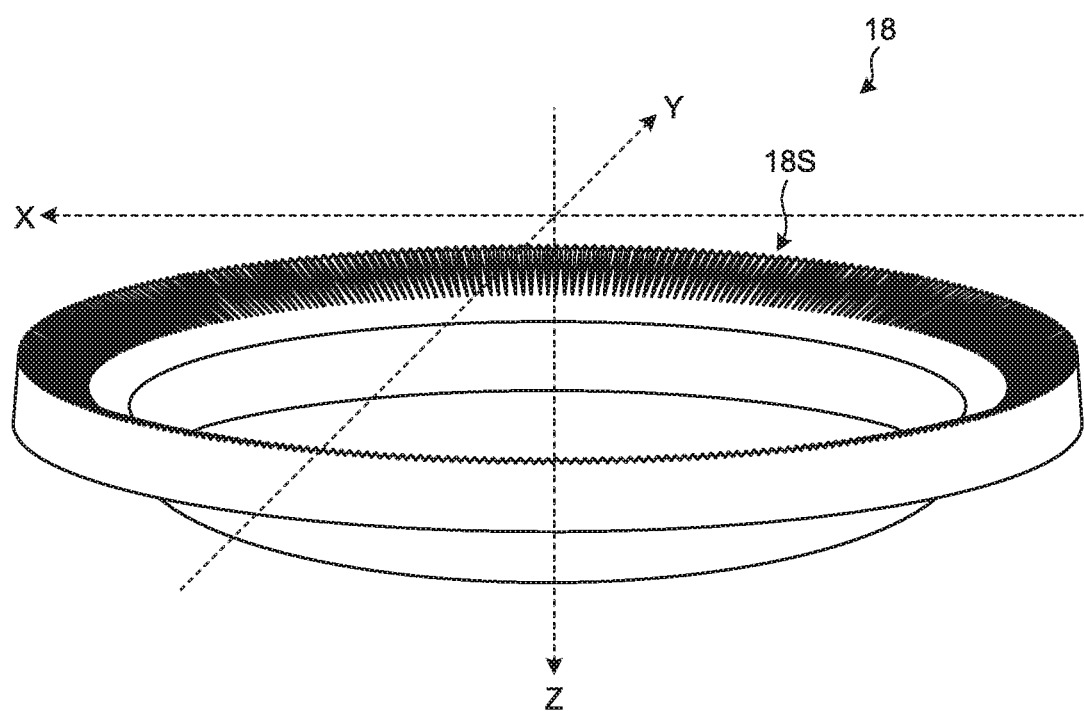
FIG. 11 is a diagram illustrating a configuration of the prism plate of the imaging device illustrated in FIG. 8.
Figure 12:
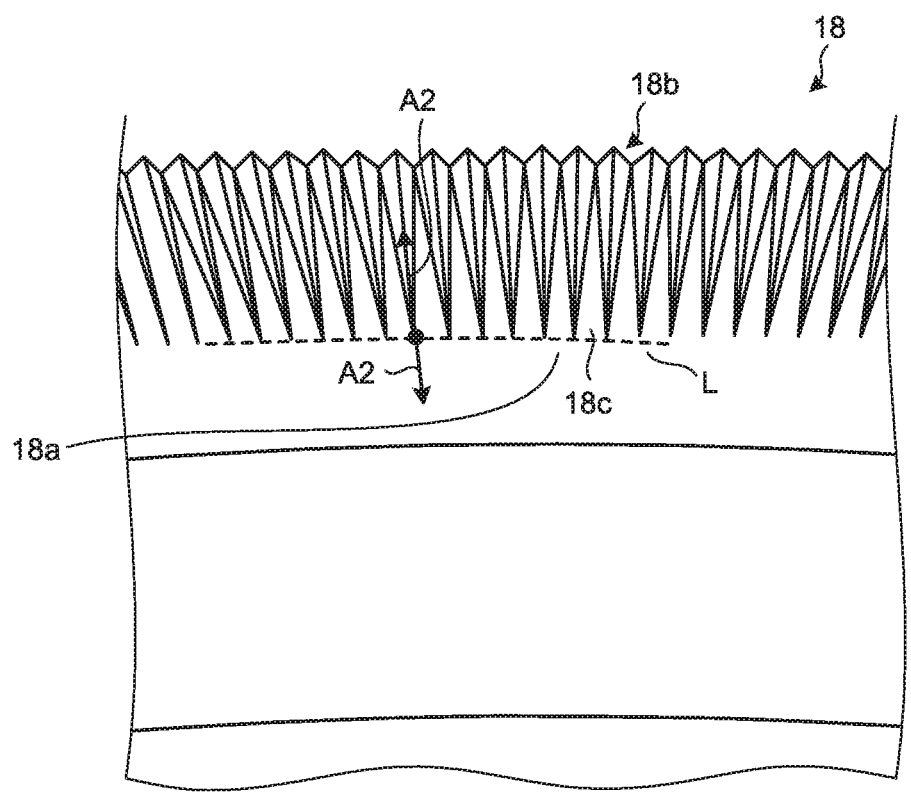
FIG. 12 is a diagram illustrating in detail a prism surface of a prism plate of the first embodiment.
Figure 12:
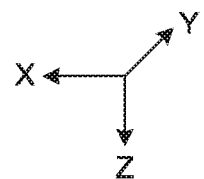
Figure 13:
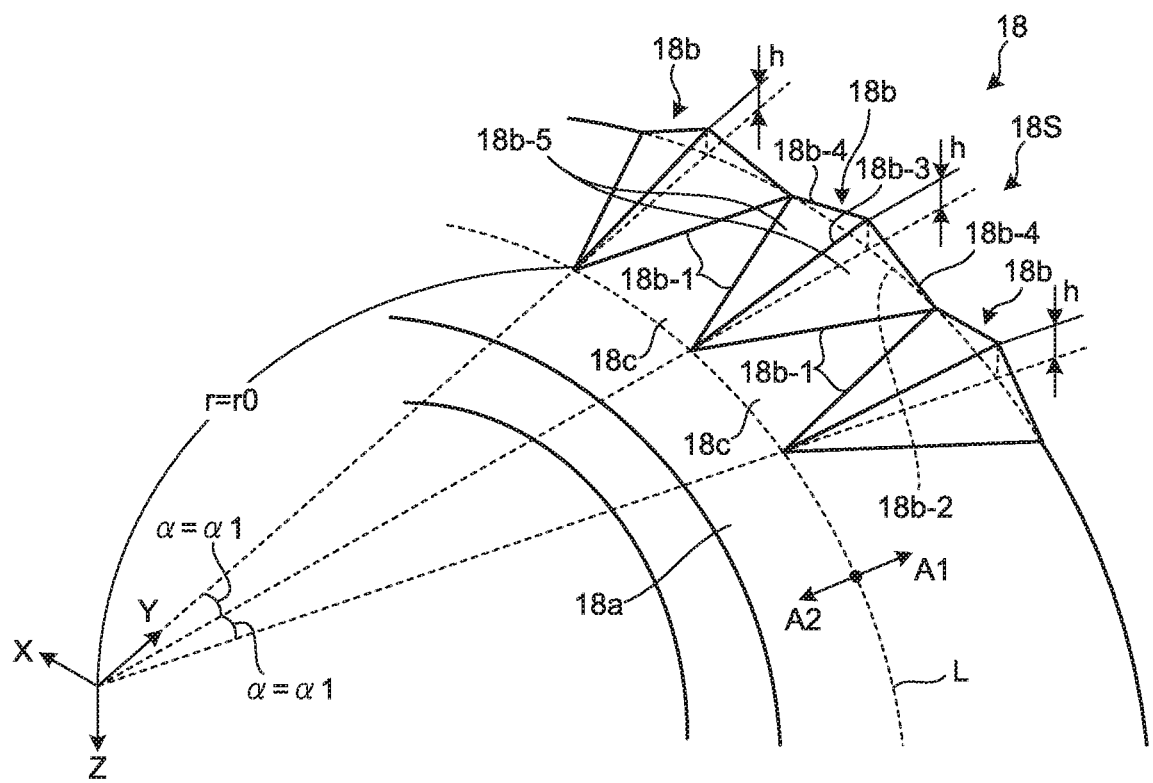
FIG. 13 is a perspective view illustrating the radial position, the height, and the pitch angle of the prism of the prism plate of the first embodiment.
Figure 14:
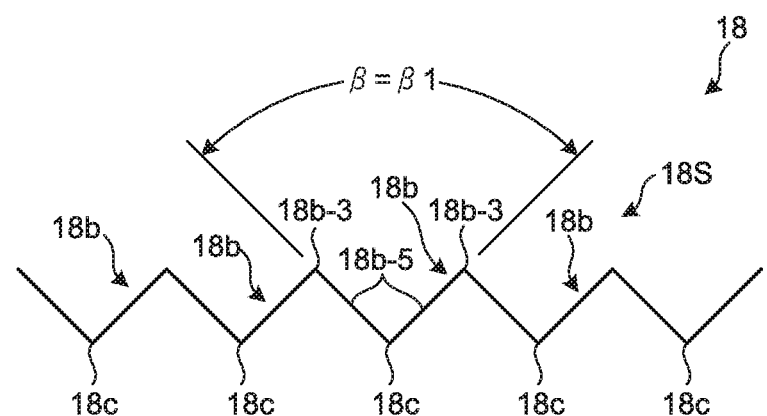
FIG. 14 is an XZ side view illustrating a prism angle of the prism plate of the first embodiment.

FIG. 11 is a diagram illustrating a configuration of the prism plate of the imaging device illustrated in FIG. 8. FIG. 12 is a diagram illustrating in detail a prism surface of a prism plate of the first embodiment. FIG. 13 is a perspective view illustrating the radial position, the height, and the pitch angle of the prism of the prism plate of the first embodiment. FIG. 14 is an XZ side view illustrating a prism angle of the prism plate of the first embodiment. FIGS. 11 to 14 illustrate the circular truncated cone-shaped prism plate 18 illustrated in FIGS. 8 and 9, with the positive and negative directions of the Z axis from the illustrations of FIGS. 8 and 9 shown, inverted. The surface of the prism plate 18 as seen from the negative direction of the Z axis, i.e. the incidence plane whereon the illumination light falls incident, is called the prism surface, and the surface of the prism plate 18 as seen from the positive direction of the Z axis, is called the emission plane, from which the illumination light that has passed through the prism plate 18 is emitted.

As illustrated in FIGS. 11 to 13, the prism plate 18 has an annular shape centered on the Z axis. Prism rows, which include a plurality of prisms 18b, are formed on prism surface 18S of the prism plate 18. The plurality of prisms 18b are formed and arranged along the circumferential direction of the prism plate 18 that is formed having an annular shape. Note that, hereinafter, the direction, in which the prisms 18b of the prism plate 18 formed having an annular shape are aligned (the X direction in FIG. 13), is taken to be the alignment direction, while the direction of extension of the prisms 18b is taken to be the ridge line direction (the Y direction in FIG. 13). The prism surface 18S is tilted in the positive direction of the Z axis in moving from the outer peripheral side toward the inner peripheral side when the Z axis is taken as the center. As illustrated in FIG. 13, the plurality of prisms 18b of the prism surface 18S include oblique sections 18b-5, which are tilted relative to the alignment direction and which correspond to oblique surfaces of peaks where each of the prisms 18b are formed, and include ridge lines 18b-3, which are parallel in the alignment direction and which correspond to the ridge lines of the peaks.

Further, as illustrated in FIGS. 12 and 13, the plurality of prisms 18b are formed on an outer peripheral side A1, of the prism surface 18S, outward from a circumference L of radius r=r0 on a plane XY and centered on the Z axis. Furthermore, a flat section 18a is formed on an inner peripheral side A2, of the prism surface 18S, inward from the circumference L of radius r=r0 on plane XY and centered on the Z axis, and the prisms 18b are not formed on the inner peripheral side A2.

As illustrated in FIG. 13, adjacent prisms 18b are arranged on the prism plate 18 at equal pitch intervals that are each α=α1. Each prism 18b has two sides 18b-1 and two arcs 18b-2, which form the base section of the prism 18b. The arcs 18b-2 are part of the outer periphery of the prism plate 18 that is centered on the Z axis. The base section of the prism 18b has a fan shape, which is formed by the two sides 18b-1 and the arcs 18b-2 that span between the endpoints of the two sides 18b-1, on the surface, of the prism plate 18, where the prism 18b is placed.

Furthermore, each prism 18b has a ridge line 18b-3 and two sides 18b-4, which form the ridge of the prism. The maximum height of the prism 18b, which is formed by the two sides 18b-1 and arcs 18b-2, the ridge line 18b-3, and the two sides 18b-4, is "h". The surfaces formed by the sides 18b-1, the ridge line 18b-3, and the sides 18b-4 are oblique sections 18b-5. Flat sections 18c, which are positioned between the oblique sections 18b-5 of adjacent prisms 18b, are valleys that are formed between each of the oblique sections 18b-5 of a plurality of prisms 18b.

Thus, the surface, whereon each prism 18b is placed on the prism plate 18, has a fan shape, in which the pivot for the fan shape is oriented in the Z axis direction. Accordingly, the flat section 18c, which roughly has an isosceles triangle shape and extends in a direction away from the Z axis and is formed by an arc segment of circumference L that is cut between the sides 18b-1 and vertices of adjacent prisms 18b, is formed between adjacent prisms 18b on the prism plate 18.

Furthermore, the prism plate 18 is formed such that the height of the ridge line 18b-3 of the prism, which is formed, for each prism 18b, along the direction of the radius r of the prism plate 18, is high with respect to the prism plate 18 in moving from the radius r=r0 toward the outer peripheral side. For the prism plate 18, the ratio, between the surface areas of the flat sections and prisms, is 100:0 as far as the radius r=r0 centered on the optical axis (the Z axis). Further, for the prism plate 18, when the radius r=r0 centered on the optical axis (the Z axis) is exceeded, whereas the surface area of the flat sections 18c gradually decreases according to the radius r, the surface area of the oblique sections 18b-5 gradually increases. In other words, the prism plate 18 has a flat section 18a on a side A2 (on an inner peripheral side) with a radial position of radius r=r0 centered on the optical axis (Z axis) as the boundary thereof. In addition, the prism plate 18 is formed such that, on an A1 side (an outer peripheral side) spaced apart from the optical axis, the ratio of the surface area of the oblique sections 18b-5 of the prisms 18b relative to the flat sections 18c, rises in the tangential direction of the circumference of radius r according to the size of the radius r. By making the height of the ridge line 18b-3 of the prisms 18b rise gradually according to the radius r, the ratio, between the surface areas of a flat surface 10c extending from the inner peripheral side to the outer peripheral side, and the oblique sections 18b-5, changes from 100:0 to 50:50 and then to 0:100, for example.

Furthermore, the XZ cross sectional view of the prism plate 18, which is illustrated in FIG. 14, is a side view, in which the prism plate 18 is viewed from an outer peripheral direction. The pitch angle R of the prisms 18b, which is formed between the respective ridge lines 18b-3 and the respective oblique sections 18b-5 of adjacent prisms 18b, and the flat sections 18c that are formed between the adjacent prisms 18b, is "β1". The prism rows, which contain the prisms 18b, form triangular shapes when viewed in an XZ cross section that is orthogonal to the ridge line direction of the prism rows.

(Light Guide Body and Prism Plate of the First Embodiment)

Figure 15:
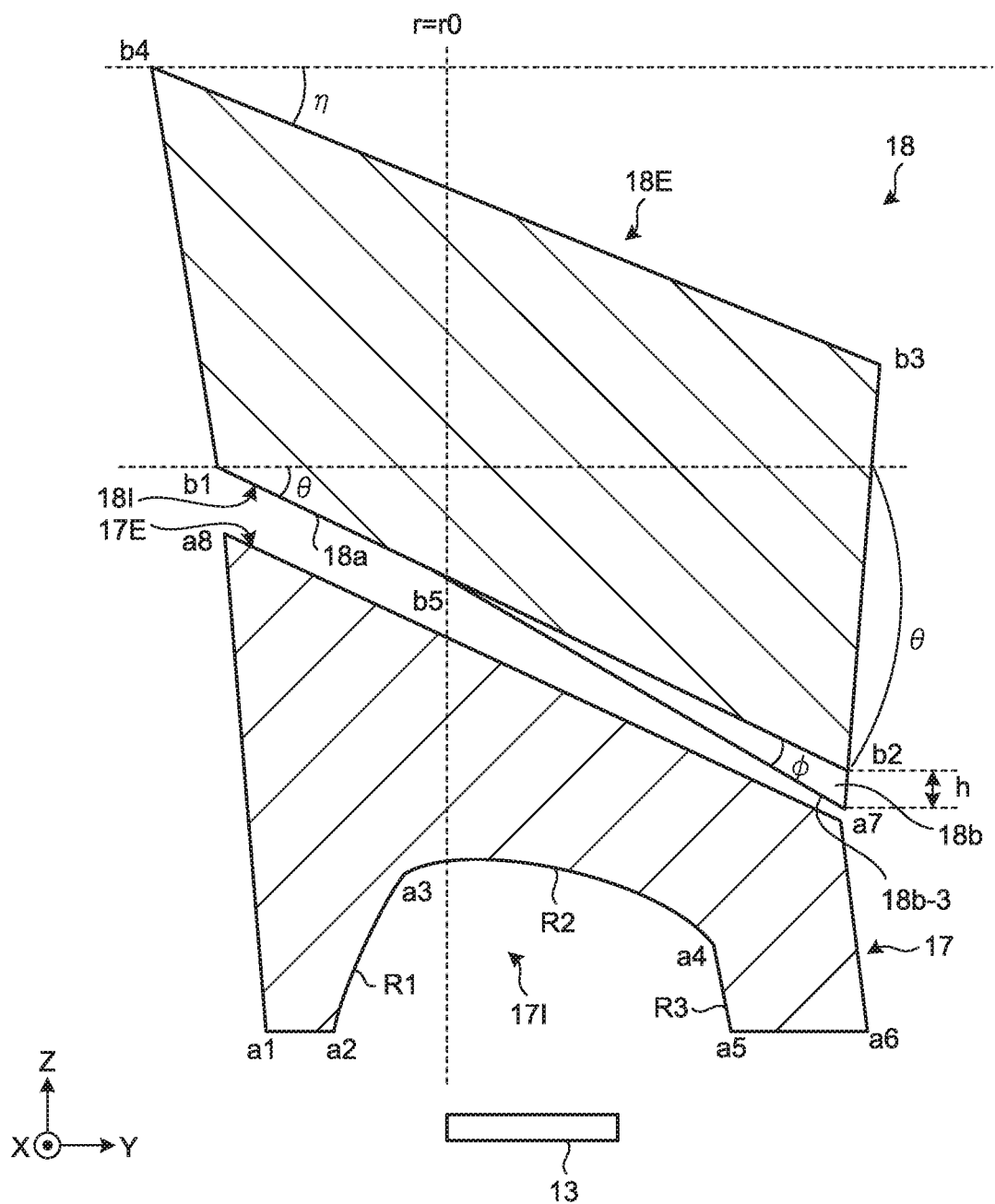
FIG. 15 is an XZ cross-sectional view illustrating a light guide body and the prism plate of the first embodiment.

FIG. 15 is an XZ cross-sectional view illustrating the light guide body and the prism plate of the first embodiment. FIG. 15 illustrates the prism plate 18 such that the positive and negative directions of the Z axis direction have the same orientation as in FIGS. 8 and 9. As illustrated in FIG. 15, in an XZ cross-sectional view, the light guide body 17 is formed by each of points a1 to a8 on plane XZ. In the light guide body 17, an incidence plane 171, which is formed by the points a2 to a5 on plane XZ, for illumination light emitted from the LEDs 13, has a curved surface R1, which is formed between the points a2 and a3 on plane XZ in an XZ cross-sectional view, of curvature R1. Furthermore, the incidence plane 171 has a curved surface R2, which is formed between the points a3 and a4 on plane XZ in an XZ cross-sectional view, of curvature R2. In addition, the incidence plane 171 has a curved surface R3, which is formed between the points a4 and a5 on plane XZ in an XZ cross-sectional view, of curvature R3.

Furthermore, in the light guide body 17, an emission plane 17E, which is formed by the points a7 and a8 on plane XZ, for illumination light falling incident from the LEDs 13, has a predetermined angle with respect to the X axis in an XZ cross-sectional view.

Further, as illustrated in FIG. 15, the prism plate 18 is formed by the points b1 to a6 on plane XZ in an XZ cross-sectional view. The points b1, b5, and b2 on plane XZ are arranged on a straight line in an XZ cross-sectional view. Point b5 on plane XZ is a point at which the radius r on plane XY of the prism plate 18 centered on the Z axis is "r0".

Furthermore, in the prism plate 18, an incidence plane 18I, which is formed by the points b1, b5, and b2 on plane XZ, for illumination light emitted from the emission plane 17E of the light guide body 17, is formed so as to make an angle θ with the Y axis in an XZ cross-sectional view. The incidence plane 18I is the foregoing prism surface 18S. The flat section 18a is tilted through an angle θ relative to the radial direction (the Y axis) centered on the optical axis of the prism plate 18. In other words, the angle θ, which the incidence plane 18I forms with the Y axis, is the same as the angle θ, which the flat section 18a forms with the X axis. Note that the flat sections 18c are, like the flat section 18a, tilted through an angle θ relative to the direction of radius r.

Furthermore, the prism 18b is formed containing the points b5 and b2 on plane XZ in a section, of the incidence plane 18I, where the radius r on plane XY of the prism plate 18 centered on the Z axis is on the outer peripheral side of point b5, on plane XZ. The ridge line 18b-3 of the prism 18b is formed so as to form an angle φ relative to a line segment between b5 and b2 on plane XZ in an XZ cross-sectional view. In other words, ridge line 18b-3 has an angle φ that is tilted further relative to the flat section 18a. The height of the section, of the prism 18b, with the greatest height relative to the line segment between b5 and b2 on plane XZ, is "h".

In addition, in the prism 18b, an emission plane 18E, which is formed by the points b3 and b4 on plane XZ, for illumination light that is emitted from the emission plane 17E of the light guide body 17, forms an angle n relative to the Y axis in an XZ cross-sectional view.

(Relationship Between Incident Light and Emitted Light in Light Guide Body of the First Embodiment)

Figure 16:
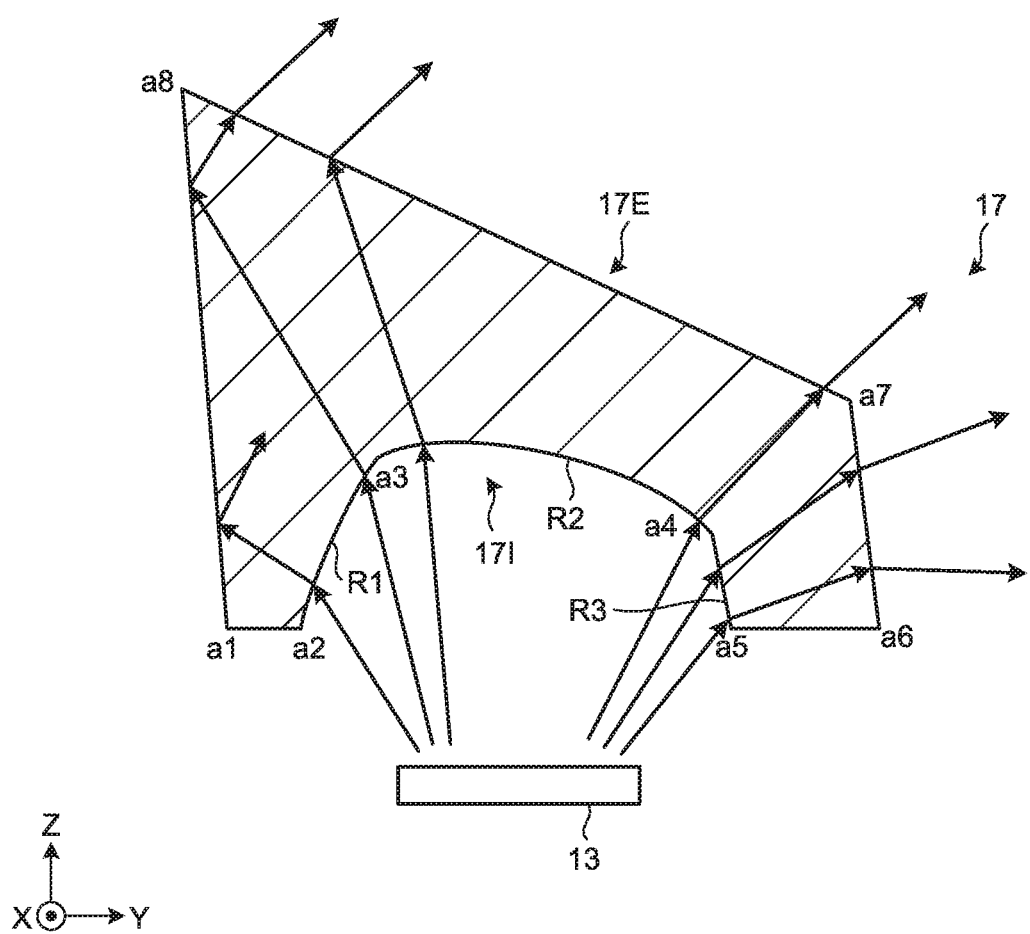
FIG. 16 is a diagram illustrating the relationship between the incident light and emitted light of the light guide body of the first embodiment.

FIG. 16 is a diagram illustrating the relationship between the incident light and emitted light of the light guide body of the first embodiment. In the light guide body 17 of the configuration illustrated in FIG. 15, of the illumination light that is emitted from the LED 13, the illumination light falling incident from the curved surface R1 is fully reflected at the inner wall, which is formed by the points a1 and a2 on plane XZ, on the innermost peripheral side that is centered on the Z axis of the light guide body 17, in an XZ cross-sectional view. In other words, the light guide body 17 has an incidence plane of curvature R1 that causes illumination light from the LED 13 to be fully reflected at the inner wall on the inner peripheral side that is centered on the optical axis of the light guide body 17. Further, illumination light, which has been fully reflected at the inner wall on the innermost peripheral side that is centered on the Z axis of the light guide body 17, is emitted from the emission plane 17E.

In the light guide body 17 of the configuration illustrated in FIG. 15, of the illumination light that is emitted from the LED 13, the illumination light falling incident from the curved surface R2, is refracted inside the light guide body 17 in an XZ cross-sectional view, and emitted from the emission plane 17E. In other words, the light guide body 17 has an incidence plane of curvature R2 that causes illumination light from the LED 13 to be emitted, at the emission plane 17E of the light guide body 17, by being scattered from the inner peripheral side toward the outer peripheral side of the light guide body 17 centered on the optical axis.

Furthermore, in the light guide body 17, illumination light falling incident from the curved surface R3, is refracted inside the light guide body 17 so as to be emitted outward from an inner wall, which is formed by the points a6 and a7 on plane XZ, on the outermost peripheral side that is centered on the Z axis of the light guide body 17, in an XZ cross-sectional view. In other words, the light guide body 17 has an incidence plane of curvature R3 that transmits illumination light from the LED 13 to outside the light guide body from the inner wall on the outer peripheral side that is centered on the optical axis of the light guide body 17.

(Illumination Light that Falls Incident on the Light Guide Body and that is Emitted from the Prism Plate)

Figure 17:
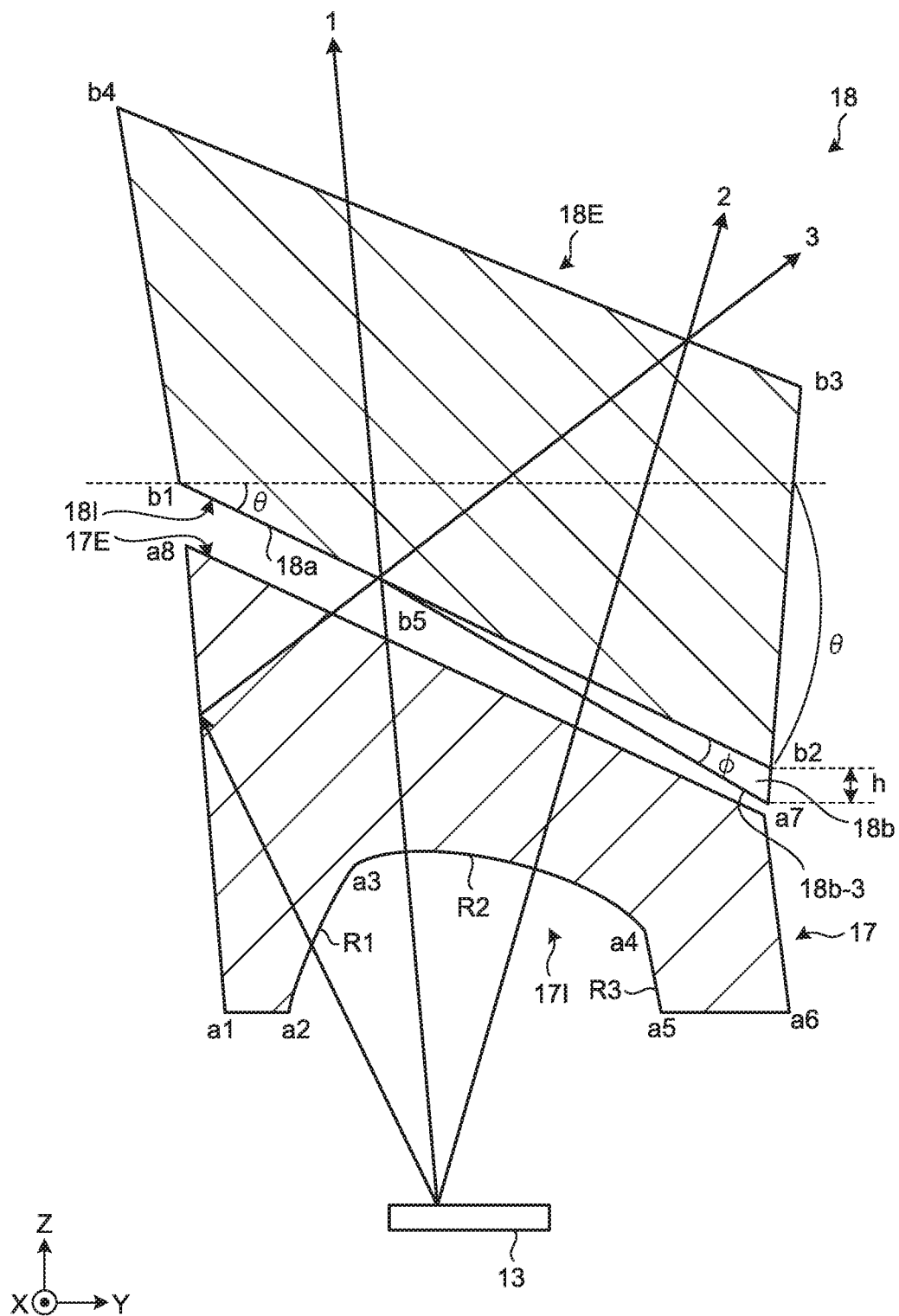
FIG. 17 is a YZ cross-sectional view illustrating illumination light that falls incident on the light guide body and that is emitted from the prism plate, in the illumination optical system for an imaging device of the first embodiment.
Figure 18:
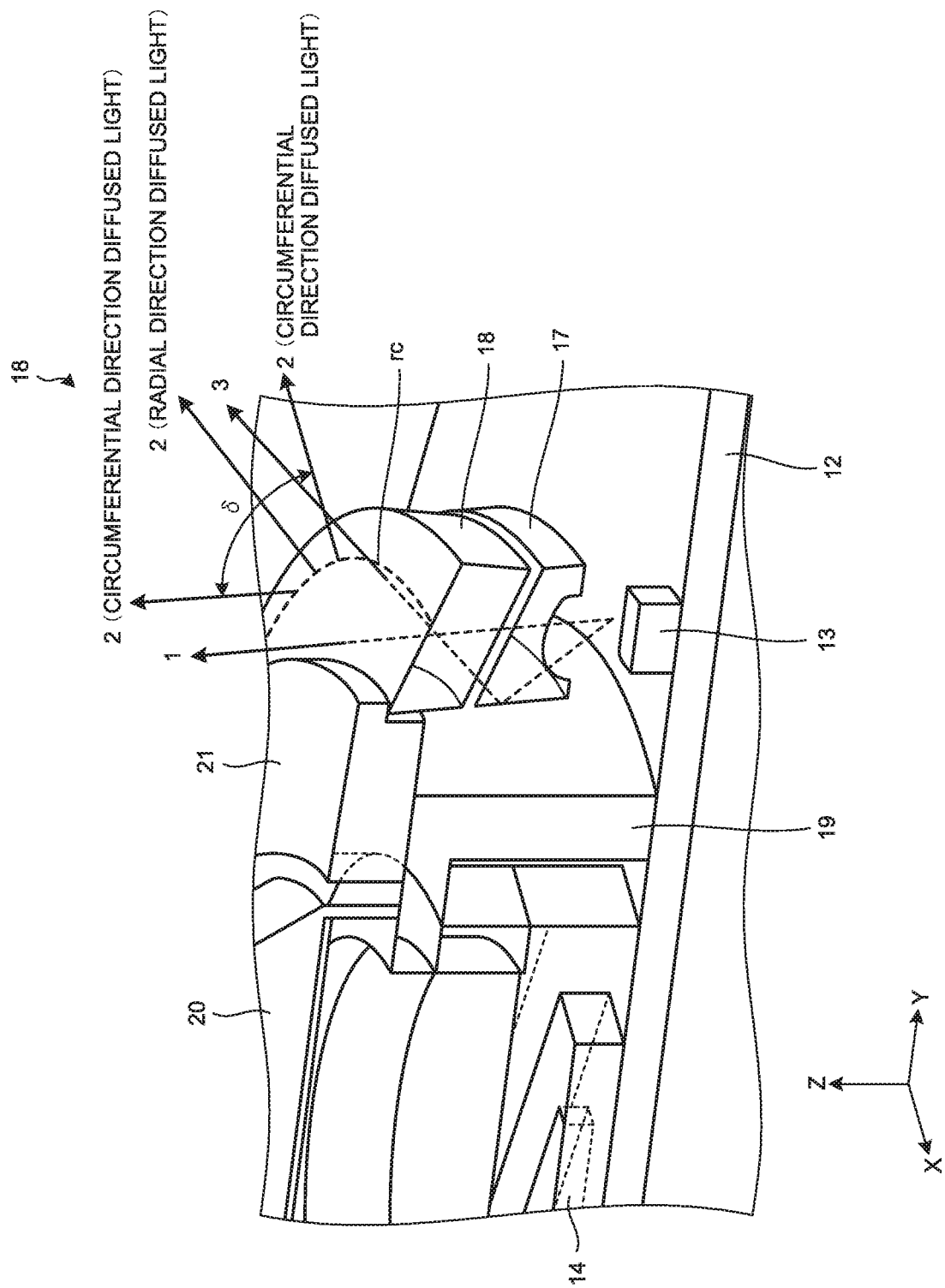
FIG. 18 is a perspective view illustrating illumination light that falls incident on the light guide body and that is emitted from the prism plate, in the illumination optical system for an imaging device of the first embodiment.

FIG. 17 is a YZ cross-sectional view illustrating illumination light that falls incident on the light guide body and that is emitted from the prism plate, in the illumination optical system for an imaging device of the first embodiment. FIG. 18 is a perspective view illustrating illumination light that falls incident on the light guide body and that is emitted from the prism plate, in the illumination optical system for an imaging device of the first embodiment. As described with reference to FIG. 16, the illumination light of the LED 13, which falls incident from the curved surface R1 and the curved surface R2 in the incidence plane 17I of the light guide body 17, is emitted from the emission plane 17E and falls incident on the prism plate 18 from the incidence plane 18I. Further, illumination light, which falls incident from the curved surface R1 and is emitted from the emission plane 17E, falls incident on the prism plate 18 from the flat section 18a. However, the illumination light, which falls incident from the curved surface R2 and is emitted from the emission plane 17E, includes illumination light, which falls incident on the prism plate 18 from the flat section 18a, and illumination light, which falls incident on the prism plate 18 from the prism 18b.

As illustrated in FIGS. 17 and 18, illumination light 1 falls incident from the curved surface R2 and is emitted from the emission plane 17E, and falls incident on the prism plate 18 from the flat section 18a. Further, of the illumination light that is projected onto the object from the cover 22 of the imaging device 10, the illumination light 1 has a central focus in which light is focused on the side of the Z axis, which is the optical axis (in the radial direction of the prism plate 18). The illumination light 1 is direct light that is projected directly onto the object from the cover 22 of the imaging device 10.

Furthermore, as illustrated in FIGS. 17 and 18, the illumination light 2 falls incident from the curved surface R2 and is emitted from the emission plane 17E, and falls incident, from the prism 18b, on the prism plate 18 in a position where the radius r=rc. Further, of the illumination light that is projected onto the object from the cover 22 of the imaging device 10, the illumination light 2 is circumferential direction diffused light that is diffused in the circumferential direction of the prism plate 18 centered on the Z axis, which is the optical axis, and radial direction diffused light that is diffused in the radial direction of the prism plate 18 centered on the Z axis. The circumferential direction diffused light will be referred to as illumination light 2 (circumferential direction diffused light). In addition, the radial direction diffused light will be referred to as illumination light 2 (radial direction diffused light).

Furthermore, as illustrated in FIGS. 17 and 18, illumination light 3 falls incident from the curved surface R1 and is emitted from the emission plane 17E, and falls incident on the prism plate 18 from the flat section 18a. Further, illumination light 3 is light that is reflected at the inner wall on the innermost peripheral side that is centered on the Z axis of the light guide body 17 and is, of the illumination light that is projected onto the object from the cover 22 of the imaging device 10, inner wall reflected light that is diffused outward, taking the Z axis constituting the optical axis as the center (in the radial direction of the prism plate 18). The illumination light 3 is diffused light that is projected by being diffused outward from the center of the object from the cover 22 of the imaging device 10.

(Ratio of Radial-Direction and Circumferential-Direction Illumination Light for Each Type of Illumination Light)

Figures 19, 20:
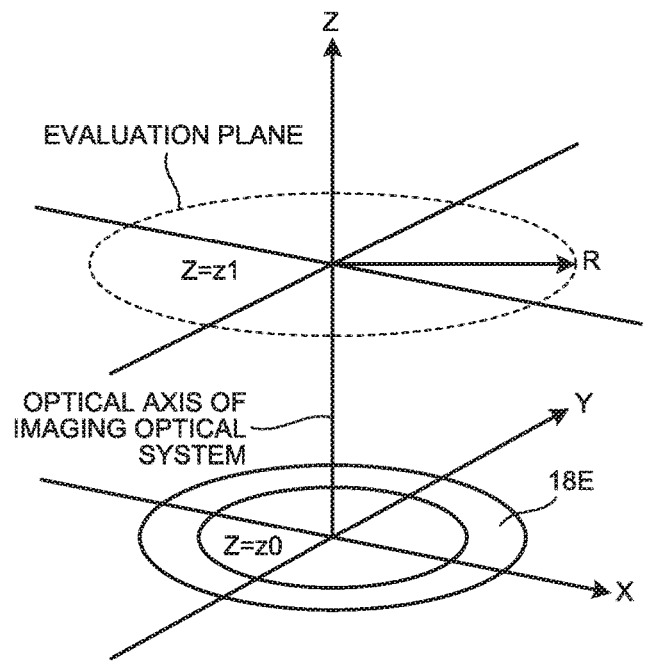
FIG. 19 is a diagram illustrating ratios of illumination light in the radial direction and the circumferential direction for each type of illumination light that falls incident on the light guide body and that is emitted from the prism plate, in the illumination optical system for an imaging device of the first embodiment.
FIG. 20 is a diagram illustrating the relationship between an illuminance evaluation plane in the illumination optical system for an imaging device of the first embodiment, and the emission plane of the illumination optical system.

FIG. 19 is a diagram illustrating ratios of illumination light in the radial direction and the circumferential direction for each type of illumination light that falls incident on the light guide body and that is emitted from the prism plate, in the illumination optical system for an imaging device of the first embodiment. As illustrated in FIG. 19, the illumination light 1, which, upon reaching a palm constituting an object, reaches a central section of the palm, is direct light 100% of which is focused centrally in the radial direction, with 0% of the light beam being diffused in the circumferential direction, as mentioned earlier. In addition, the illumination light 3, which, upon reaching a palm constituting an object, reaches a peripheral section of the palm, is inner wall reflected light 100% of which is diffused in the radial direction, with 0% of the light beam being diffused in the circumferential direction. However, the illumination light 2, which, upon reaching a palm constituting an object, reaches a central section and a peripheral section of the palm, is circumferential direction diffused light P % of which is diffused in the circumferential direction, and radial direction diffused light (100−P) % of which is diffused in the radial direction.

The respective light amounts of illumination light 2 (circumferential direction diffused light), illumination light 2 (radial direction diffused light), and illumination light 3 can be controlled by suitably determining, for the prism plate 18, the radius r=r0, which defines the circumference L of the boundary line between the flat section 18a and the prism 18b, on plane XY centered on the Z axis. By suitably determining the radius r=r0 that defines the circumference L, the majority of the illumination light, passing through the flat section 18a, is reflected at the inner wall inside the light guide body 17, thereby enabling the light amount of the illumination light 3 projected onto the peripheral section of the object to be increased. Furthermore, by suitably determining the radius r=r0 that defines the circumference L, the illumination light, passing through the prism 18b, is divided into circumferential direction diffused light and radial direction diffused light, thereby providing a suitable amount of illumination light 2 that is projected onto the central section and the peripheral section, respectively, of the object.

Figure 21:
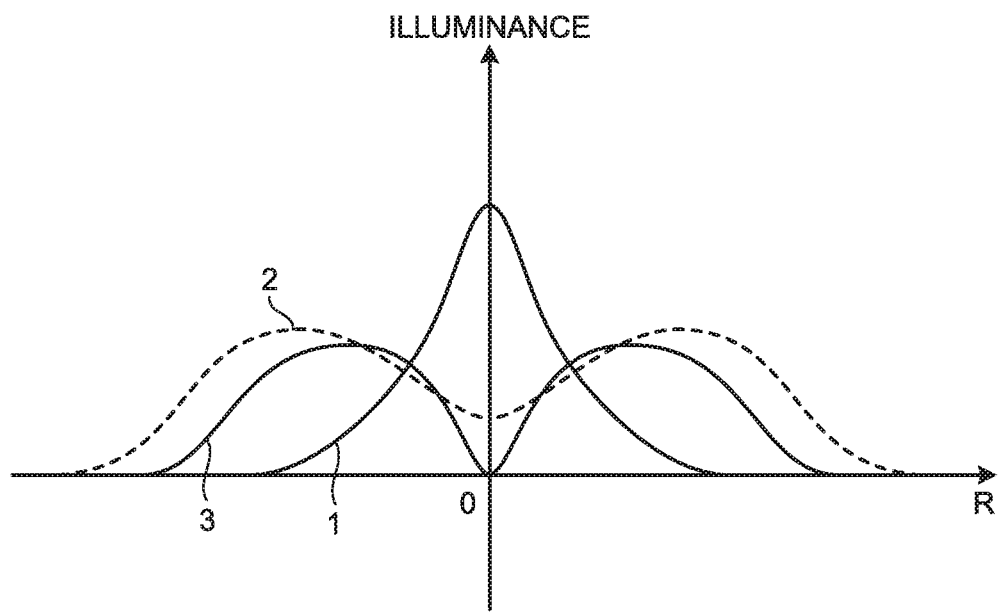
FIG. 21 is a diagram illustrating an illuminance distribution for each type of illumination light at the evaluation plane of the illumination optical system for an imaging device of the first embodiment.
Figure 22:
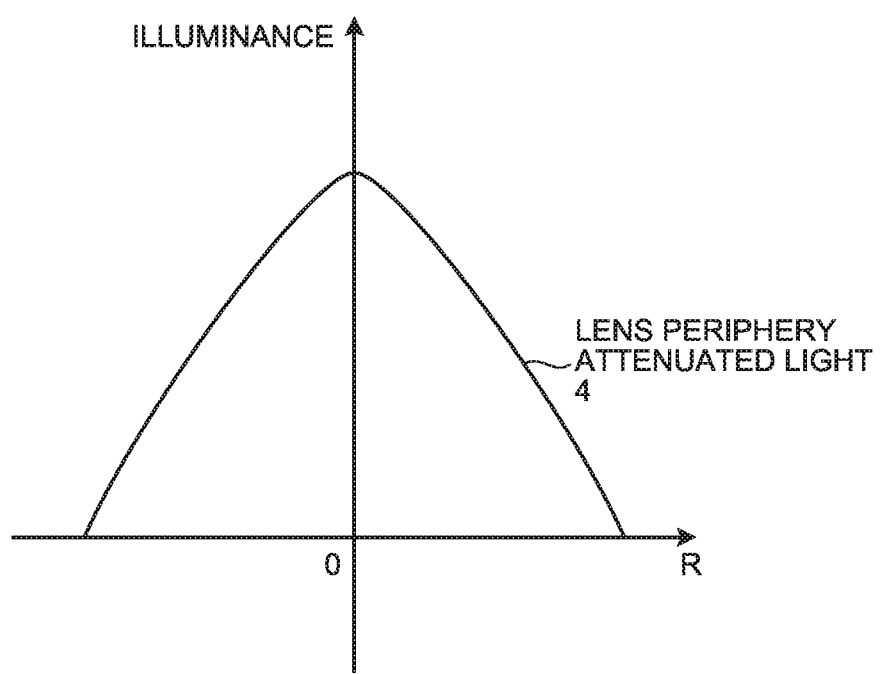
FIG. 22 is a diagram illustrating an illuminance distribution of lens periphery attenuated light at the evaluation plane of the illumination optical system for an imaging device of the first embodiment.
Figure 23:
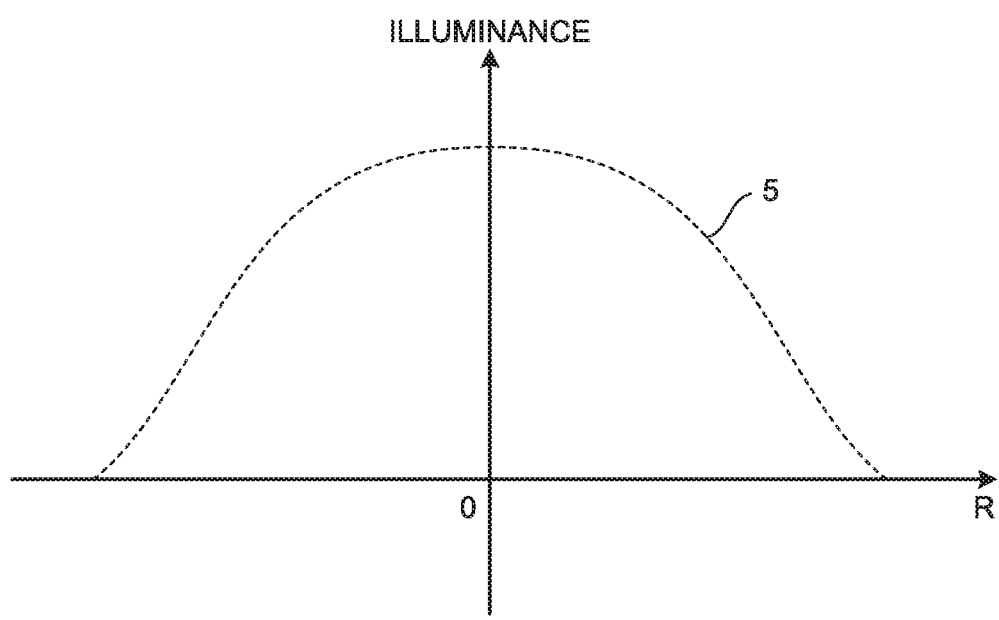
FIG. 23 is a diagram illustrating an illuminance distribution at the evaluation plane of the illumination optical system for an imaging device of the first embodiment.

FIG. 20 is a diagram illustrating the relationship between an illuminance evaluation plane in the illumination optical system for an imaging device of the first embodiment, and the emission plane of the illumination optical system. FIG. 21 is a diagram illustrating an illuminance distribution for each type of illumination light at the evaluation plane of the illumination optical system for an imaging device of the first embodiment. FIG. 22 is a diagram illustrating an illuminance distribution of lens periphery attenuated light at the evaluation plane of the illumination optical system for an imaging device of the first embodiment. FIG. 23 is a diagram illustrating an illuminance distribution at the evaluation plane of the illumination optical system for an imaging device of the first embodiment.

In FIG. 20, the optical axis direction of the imaging optical system is defined as the Z-axis direction, and the Z coordinate of the emission plane 18E of the illumination optical system (the prism plate 18) is assumed to be Z=z0, while the Z coordinate of the evaluation plane corresponding to the surface of the object is assumed to be Z=z1. Furthermore, the radial direction, which is orthogonal to the optical axis direction of the imaging optical system is defined as direction R, and the R coordinate of the optical axis of the imaging optical system is 0 (the point of origin). Note that, with regard to the illuminance distributions of the illumination optical system in FIGS. 21 to 23, the emission plane 18E of the illumination optical system has an annular shape, and hence the illuminance distribution is symmetrical relative to the vertical axis that represents illuminance.

As illustrated in FIG. 21, the illumination light 1 has a directivity distribution with a peak at R=0. This is because the illumination light 1 has a central focus in which light is focused on the side of the Z axis, which is the optical axis (in the radial direction of the prism plate 18).

In addition, the illumination light 2 has a directivity distribution in which there are two peaks each with the same radial distance R, where R=0 is the minimum. This is because the illumination light 2 includes the circumferential direction diffused light and the radial direction diffused light, which have been suitably divided. By suitably determining, for the prism plate 18, the radius r=r0 that defines the circumference L of the boundary line between the flat section 18a and the prism 18b, the illumination light 2 can be used to suppress a drop in peripheral section illuminance while ensuring peripheral section illuminance.

In addition, the illumination light 3 has a directivity distribution in which there are two peaks each with the same radial distance R, where R=0 is zero. This is because the illumination light 3 is inner wall reflected light that is diffused outward, taking the Z axis constituting the optical axis as the center (in the radial direction of the prism plate 18). The illumination light 3 is a curve that varies smoothly in the vicinity of the two peaks in comparison with the prior art, in which the prism plate is not provided with a flat section and is only provided with a prism. Thus, in the first embodiment, in comparison with the prior art, the drop in the illuminance between the two peaks (corresponds to the central section of the palm), is small, and the illuminance is improved in the vicinity of the two peaks (corresponds to the peripheral section of the palm).

Further, when the attenuated light component of the lens periphery attenuated light 4 representing the illuminance distribution in FIG. 22 is taken into account, the synthesized light at the evaluation plane of the illumination light 1 to illumination light 3 has, at the evaluation plane, a substantially flat illuminance distribution 5 in the range of a fixed radial position, as illustrated in FIG. 23. That is, according to the first embodiment, uniformity of the illuminance of the central section (central luminance) of the object at the evaluation plane, can be ensured while suppressing a drop in the illuminance of the peripheral section of the object (peripheral luminance), thereby rendering uniform the illuminance of the illumination light reaching the object.

According to the first embodiment, the prism plate 18 has a flat section 18a on an optical axis side (inner peripheral side) with a radius r=r0 centered on the optical axis as the boundary thereof, and, on the side spaced apart from the optical axis (the outer peripheral side), the height of the ridge line 18b-3 relative to the prism plate 18 is gradually increased according to the size of radius r. Accordingly, the prism plate 18 is formed such that the ratio of the surface area of the oblique sections 18b-5 to the flat section 18c rises in the tangential direction of the circumference of radius r. Hence, the generation of an unwanted bright line can be prevented without suddenly changing the directivity characteristic of the illumination light in the region of the boundary at radius r=r0. In addition, according to the first embodiment, the ridge line 18b-3 forms an oblique of angle φ relative to the flat section 18a and the flat sections 18c. Therefore, by suitably defining the radius r and angle φ, it is possible to arbitrarily change the directivity of the illumination light emitted from the emission plane 18E.

Furthermore, according to the first embodiment, it is possible to ensure, on an outer peripheral side (corresponds to the peripheral section of the object), illuminance of the peripheral section of an object (the peripheral luminance), by synthesizing the illumination light passing through the oblique sections 18b-5, and the illumination light passing through the flat section 18a and the flat sections 18c. In addition, the inner peripheral side (corresponds to the central section of the object) enables the creation of illumination light in two directions, namely, centrally focused light focused toward the optical axis side of the imaging device 10, and internally reflected light that is fully reflected toward the outer peripheral side by inner wall reflection inside the light guide body 17. The inner wall reflected light contributes to an improvement in the luminance of the illumination light that is projected onto the peripheral section of the object on the outer peripheral side, and enables an increase in the illuminance of the peripheral section of the object (peripheral luminance). Thus, the peripheral luminance can be improved while maintaining the flatness of the illuminance of the illumination light reaching the object.

In addition, according to the first embodiment, by adjusting the radius r=r0 of the circumference L constituting the boundary between the flat section 18a and the prisms 18b, the light amount of the illumination light reaching the central section of the palm can be easily controlled without the need for machining to provide a flat section to the prism ridge lines, or the like.

Second Embodiment

Figure 24:
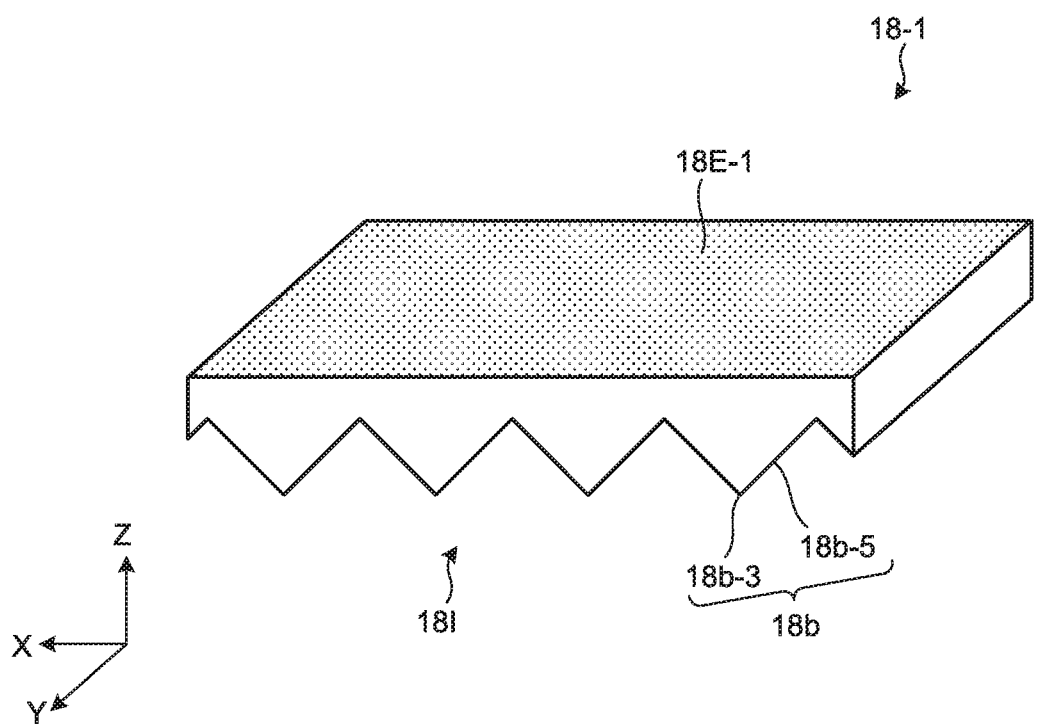
FIG. 24 is a diagram illustrating a prism plate in which the emission plane is formed as a blast surface, in the illumination optical system for an imaging device of a second embodiment.
Figure 25:
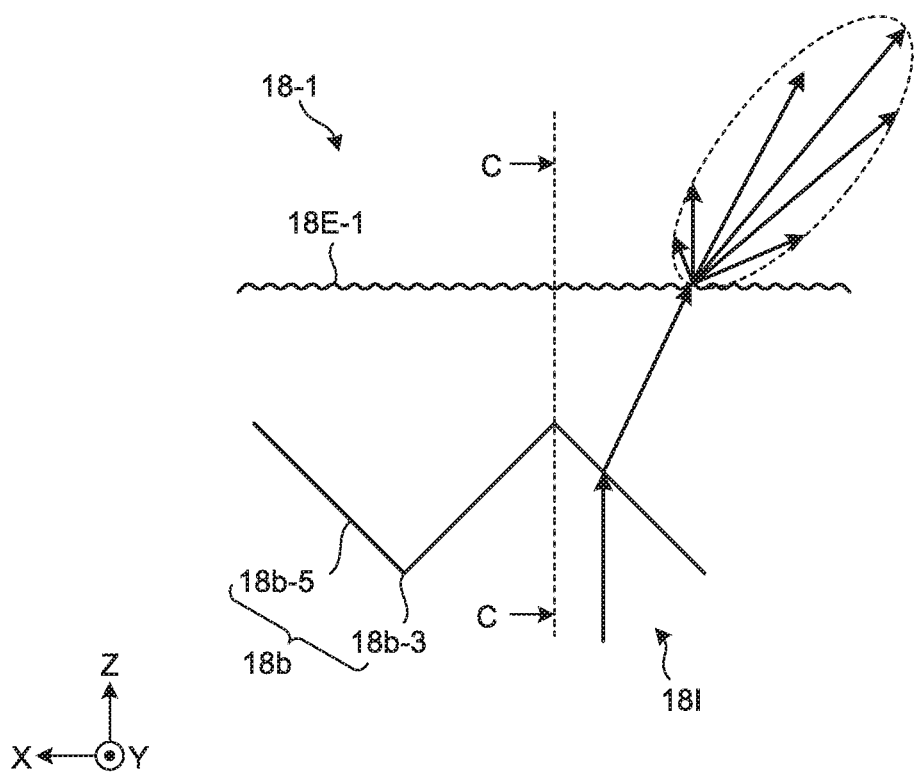
FIG. 25 is a diagram illustrating the relationship between incident light falling perpendicularly incident on the prism plate, and emitted light, at an XZ cross section of the prism plate illustrated in FIG. 24.
Figure 26:
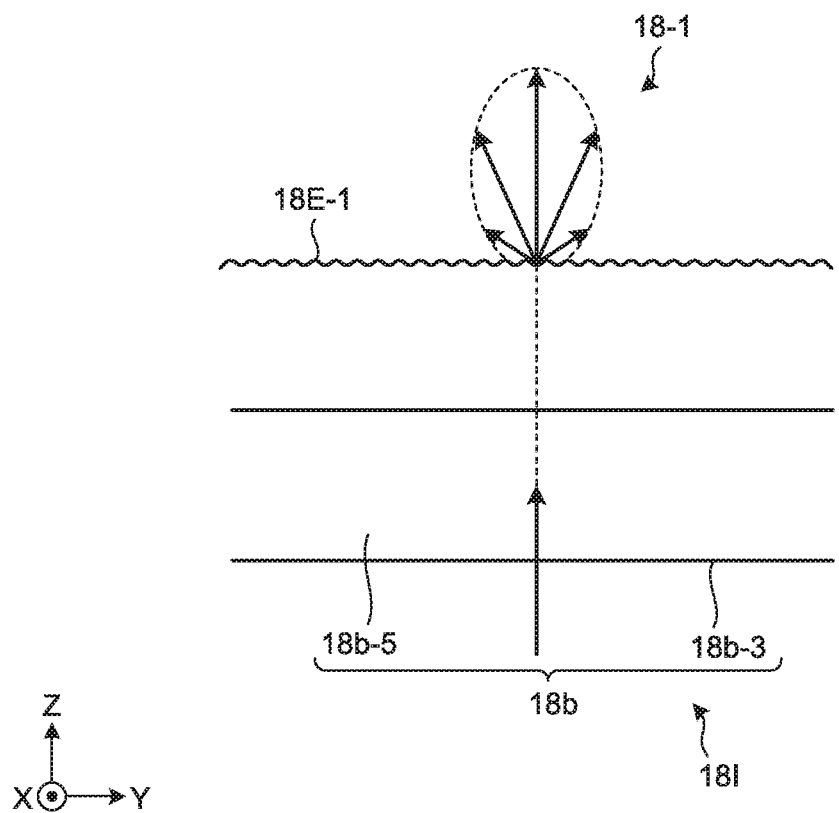
FIG. 26 is a diagram illustrating the relationship between incident light falling perpendicularly incident on the prism plate illustrated in FIG. 24, and emitted light, at a YZ cross section along line CC illustrated in FIG. 25.
Figure 27:
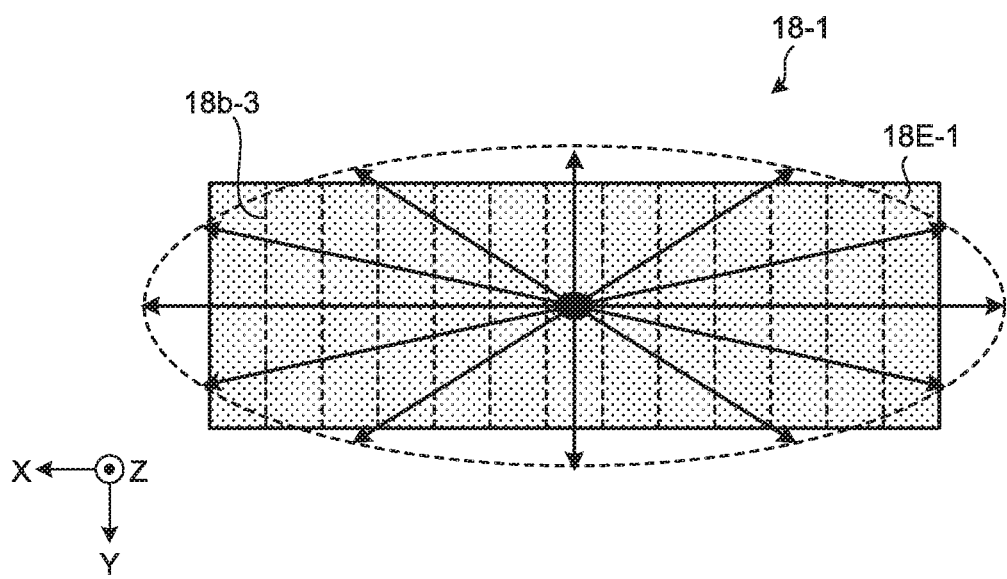
FIG. 27 is a diagram illustrating the directivity of emitted light when the prism plate, which is illustrated in FIG. 24, is viewed from the emission plane.

The illumination optical system according to a second embodiment is like the illumination optical system according to the first embodiment, except that prism plate 18-1, which is illustrated in FIG. 24, is included instead of the prism plate 18. FIG. 24 is a diagram illustrating a prism plate in which the emission plane is formed as a blast surface, in the illumination optical system for an imaging device of the second embodiment. FIG. 25 is a diagram illustrating the relationship between incident light falling perpendicularly incident on the prism plate, and emitted light, at an XZ cross section of the prism plate illustrated in FIG. 24. FIG. 26 is a diagram illustrating the relationship between incident light falling perpendicularly incident on the prism plate illustrated in FIG. 24, and emitted light, at a YZ cross section along line CC illustrated in FIG. 25. FIG. 27 is a diagram illustrating the directivity of emitted light when the prism plate, which is illustrated in FIG. 24, is viewed from the emission plane.

The prism plate 18-1, which is illustrated in FIG. 24, has an incidence plane 18I, on which prism rows that contain a plurality of prisms 18b having the ridge line 18b-3 and the oblique sections 18b-5 are formed on the light guide body 17 side, and has an emission plane 18E-1, which is a plane parallel to plane XY and an object constituting an imaging target. The prism rows, which contain the prisms 18b, form triangular shapes, when viewed in an XZ cross section that is orthogonal to the ridge line direction of the prism rows. The emission plane 18E-1 is formed as a blast surface (diffusing surface), in which minute irregularities are formed by means of blasting. Note that illustrations of the flat section 18a and the flat section 18c have been omitted from FIGS. 24 to 26.

As illustrated in FIGS. 25 and 26, the illumination light, which falls incident upon the prism plate 18-1 from the oblique sections 18b-5, is deflected in the X-axis direction inside the prism plate 18-1, but is diffused in the X-axis direction (the circumferential direction) and the Y-axis direction (the radial direction) by the emission plane 18E-1 which is a blast surface. Similarly, the illumination light, which falls incident upon the prism plate 18-1 from the flat section 18a or the flat sections 18c, is also diffused in the X-axis direction and the Y-axis direction by the emission plane 18E-1. Accordingly, when emitted from the emission plane 18E-1, the illumination light is also emitted in a direction perpendicular to the ridge line 18b-3 (in the X-axis direction) and in the ridge line direction parallel to the ridge line 18b-3 (in the Y-axis direction).

Note that, as also described in the first embodiment, the illumination light, which is emitted from the prism plate 18-1, has directivity that is suitably diffused in the X-axis direction (the circumferential direction) and the Y-axis direction (the radial direction), even when the emission plane 18E-1 is not blasted. Further, a blast surface, which suitably diffuses emitted light in the X-axis direction and the Y-axis direction, is formed at the emission plane 18E-1 of the prism plate 18-1. Hence, the illumination light, which is emitted in each direction from the emission plane 18E-1, has a suitable directivity distribution in both directions, namely, the direction perpendicular to the ridge line 18b-3 (the X-axis direction) and the direction parallel to the ridge line 18b-3 (the Y-axis direction), as illustrated in FIG. 27. That is, according to the second embodiment, because the emission plane 18E-1 is blasted, uniformity of the illuminance of the central section (central luminance) of the object can be ensured while suppressing a drop in the illuminance of the peripheral section of the object (peripheral luminance), thereby improving the advantageous effect of rendering uniform the illuminance of the illumination light reaching the object.

According to an example of the disclosed technology, in an illumination optical system for an imaging device, uniformity of central luminance can be ensured while suppressing a drop in the peripheral luminance.

The respective configurations of the parts illustrated in the foregoing embodiments may be changed, added, omitted, integrated, or broken up to an extent not departing from the technical scope of the illumination optical system for an imaging device according to the disclosed technology. Moreover, the embodiments are merely illustrative, and in addition to the aspects disclosed in the present invention hereinabove, further aspects resulting from a variety of modifications and improvements made on the basis of the knowledge of a person skilled in the art are also included in the disclosed technology.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An illumination optical system for an imaging device, comprising:
    a plurality of light sources that is arranged in an annular shape; and
    a prism plate that is formed in an annular shape about an optical axis of illumination light from the plurality of light sources,
    wherein the prism plate includes a prism surface upon which the illumination light emitted from the light sources falls incident and on which prism rows, which contain a plurality of prisms that is arranged in an annular shape along a circumferential direction of the prism plate, are formed, a first flat section upon which the illumination light from the light sources falls incident and which is formed in an annular shape along the circumferential direction of the prism plate at the inner side of the prism surface in the radial direction of the prism plate, and an emission plane that emits the illumination light,
    wherein the prism surface is formed on an outer peripheral side outward from a predetermined radius of the prism plate that is centered on the optical axis, and
    wherein the first flat section is formed on an inner peripheral side inward from the predetermined radius of the prism plate that is centered on the optical axis.

2. The illumination optical system for an imaging device according to claim 1,
    wherein a height of a ridge line of the prism, which is formed, for each of the prisms, on the prism surface and along a radial direction of the prism plate, is formed so as to be high relative to the prism plate in moving from the predetermined radius toward the outer peripheral side.

3. The illumination optical system for an imaging device according to claim 2, further comprising:
    a light guide body that is formed in an annular shape about the optical axis of the illumination light from the light sources, that is disposed between the plurality of light sources and the prism plate, and that guides the illumination light from the plurality of light sources toward the prism surface.

4. The illumination optical system for an imaging device according to claim 3,
    wherein the light guide body has a plurality of incidence planes the curvature of which differs and upon which the illumination light from the light sources falls incident.

5. The illumination optical system for an imaging device according to claim 4,
    wherein the plurality of incidence planes includes an incidence plane having a curvature that fully refracts the illumination light from the light sources at an inner wall on the inner peripheral side centered on the optical axis of the light guide body, and
    the illumination light, which fully refracts at the incidence plane, fully reflects inside the prism plate.

6. The illumination optical system for an imaging device according to claim 4,
    wherein the plurality of incidence planes includes an incidence plane having a curvature that causes the illumination light from the light sources to be emitted at an emission plane of the light guide body by being scattered from the inner peripheral side to the outer peripheral side of the light guide body, which is centered on the optical axis.

7. The illumination optical system for an imaging device according to claim 4,
    wherein the plurality of incidence planes includes an incidence plane having a third curvature that transmits the illumination light from the light sources to outside of the light guide body from an inner wall on the outer peripheral side that is centered on the optical axis of the light guide body.

8. The illumination optical system for an imaging device according to claim 3,
    wherein the emission plane is a diffusing surface in which minute irregularities are formed.

9. The illumination optical system for an imaging device according to claim 3,
    wherein the first flat section is tilted relative to the radial direction.

10. The illumination optical system for an imaging device according to claim 3,
    wherein the emission plane is tilted relative to the radial direction.

11. The illumination optical system for an imaging device according to claim 3,
    wherein the prism plate has a circular truncated cone shape, wherein the first flat section is tilted relative to the radial direction, and wherein the emission plane is tilted relative to the radial direction.

12. The illumination optical system for an imaging device according to claim 11,
    wherein the ridge line of the prism has an angle that is tilted further relative to the first flat section.

13. The illumination optical system for an imaging device according to claim 12,
    wherein a directivity of the illumination light, which is emitted from the emission plane, is changed according to a tilt angle of the ridge line of the prism relative to the predetermined radius and the first flat section.

14. The illumination optical system for an imaging device according to claim 3,
    wherein the prism rows form triangular shapes when viewed in a cross section that is orthogonal to the radial direction of the prism plate, and wherein a second flat section is formed between the plurality of prisms.

\* \* \* \* \*